US010268354B2

(12) United States Patent
Kim et al.

(10) Patent No.: US 10,268,354 B2
(45) Date of Patent: Apr. 23, 2019

(54) LIGHT CONTROL APPARATUS AND METHOD OF CONTROLLING LIGHT THEREOF

(71) Applicant: LG INNOTEK CO., LTD., Seoul (KR)

(72) Inventors: Dae Hun Kim, Seoul (KR); Seung Hwan Song, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 613 days.

(21) Appl. No.: 14/858,443

(22) Filed: Sep. 18, 2015

(65) Prior Publication Data
US 2016/0085431 A1 Mar. 24, 2016

(30) Foreign Application Priority Data

Sep. 22, 2014 (KR) .................. 10-2014-0126201

(51) Int. Cl.
G06F 3/0484 (2013.01)
G06F 3/0482 (2013.01)
(Continued)

(52) U.S. Cl.
CPC ........ *G06F 3/04847* (2013.01); *G06F 3/0482* (2013.01); *G06F 3/04817* (2013.01); *H05B 37/029* (2013.01); *H05B 37/0272* (2013.01)

(58) Field of Classification Search
CPC ............. G06F 3/04847; G06F 3/04817; G06F 3/0482; H05B 37/0272; H05B 37/029
(Continued)

(56) References Cited

U.S. PATENT DOCUMENTS

2005/0248651 A1 11/2005 Hirata et al.
2007/0171468 A1* 7/2007 Tanji ................. H04L 29/12047
358/1.15
(Continued)

FOREIGN PATENT DOCUMENTS

EP 2706821 A1 3/2014
EP 2779651 A1 9/2014

OTHER PUBLICATIONS

European Search Report dated Apr. 18, 2016 in European Application No. 15185948.5.

*Primary Examiner* — Jennifer N To
*Assistant Examiner* — Terri L Filosi
(74) *Attorney, Agent, or Firm* — Saliwanchik, Lloyd & Eisenschenk

(57) ABSTRACT

Disclosed is a light control apparatus. The light control apparatus includes: a touch screen to display a first graphical user interface for registering a light; and a control unit to store register information about the light set through the first graphical user interface and to control the registered light by using the stored register information, wherein the first graphical user interface includes: a first area on which information about a light to be registered is displayed; and a second area on which location information for setting an installed location of a first light selected from lights displayed on the first area is displayed, wherein the location information displayed on the second area includes working field information about an actual installation place of the first light, and wherein the working field information includes a photo photographed at the actual installation place of the first light.

16 Claims, 24 Drawing Sheets

(51) Int. Cl.
*G06F 3/0481* (2013.01)
*H05B 37/02* (2006.01)

(58) Field of Classification Search
USPC .......................................... 715/735
See application file for complete search history.

(56) References Cited

U.S. PATENT DOCUMENTS

| | | |
|---|---|---|
| 2009/0243509 A1 | 10/2009 | Barnett et al. |
| 2010/0312366 A1 | 12/2010 | Madonna et al. |
| 2011/0112691 A1 | 5/2011 | Engelen |
| 2013/0068832 A1 | 3/2013 | Li et al. |
| 2014/0043791 A1 | 2/2014 | Diederiks et al. |
| 2014/0070707 A1 | 3/2014 | Nagazoe |
| 2014/0181704 A1* | 6/2014 | Madonna ........... H05B 37/0245 715/762 |
| 2014/0380234 A1* | 12/2014 | Shim ..................... G06F 3/0482 715/781 |
| 2015/0084513 A1 | 3/2015 | Anthony et al. |

* cited by examiner

LIGHT CONTROL APPARATUS AND METHOD OF CONTROLLING LIGHT THEREOF

CROSS-REFERENCES TO RELATED APPLICATION

This application claims the benefit under 35 U.S.C. § 119 of Korean Patent Application No. 10-2014-0126201, filed Sep. 22, 2014, which is hereby incorporated by reference in its entirety.

BACKGROUND

Technical Field

The embodiment relates to a light control apparatus, and more particularly, to a light control apparatus capable of providing a graphical user interface (GUI) for easily registering and controlling a light and a method of controlling a light thereof.

In general, light control is performed by operating a power switch which is one-to-one connected to a light through a wire.

As described above, when the light is controlled by using the switch, the patient, the senior citizen or the infirm who cannot move freely, or children who cannot reach the switch may feel inconvenience when turning on or off the light.

Meanwhile, recently, the market in wireless control that wirelessly controls lights of an office or a store in a large building or home has been increased. A communication module is required to be installed into the light in order to wirelessly control the light.

In order to control a specific light among a plurality of lights, a light control signal must be wirelessly transmitted to a communication module installed to the specific light through a gateway.

In this case, a user must register the lights into a light control apparatus such as a mobile terminal, such that the light control apparatus controls the operations of the registered lights based on information about the registered lights.

A specific target light is selected from a plurality of lights through a graphical user interface displayed on the light control apparatus such as a mobile terminal to set a condition of operating the selected light, so that the light control is performed.

According to the related art, in order to register lights in a network, identifiers (for example, 1, 2, 3, and 4) are previously assigned to the lights according to positions of the lights in drawings. Then, the identifiers of the lights are individually searched and input into the lights to register the lights in the network. In this case, many procedures are required to register all lights in the network and the input errors of the identifiers into the lights frequently occur, so that the maintenance and repair of the lights are not easy.

In addition, when a light is exchanged, the identifier of the light, which is arbitrarily set by a user, must be input again at the position of the light, so that maintenance work may become complex.

BRIEF SUMMARY

The embodiment provides a light control system having improved efficiency and a registering method thereof.

The embodiment provides a light control system improved in user convenience and a registering method thereof The embodiment provides a light control system for easily registering a light in a light control apparatus and a registering method thereof.

Meanwhile, the technical objects accomplished by the embodiments may not be limited to the above objects, and other technical objects of the embodiment will be clearly understood by those skilled in the art from the following description.

According to one embodiment, there is provided a light control apparatus which includes: a touch screen to display a first graphical user interface for registering a light; and a control unit to store register information about the light set through the first graphical user interface and to control the registered light by using the stored register information, wherein the first graphical user interface includes: a first area on which information about a light to be registered is displayed; and a second area on which location information for setting an installed location of a first light selected from lights displayed on the first area is displayed, wherein the location information displayed on the second area includes working field information about an actual installation place of the first light, and wherein the working field information includes a photo photographed at the actual installation place of the first light.

The first area includes a text area for displaying a light name, and an icon area for displaying a light icon.

The light icon includes a kind icon for representing a kind of a corresponding light, and the light icons which are distinguished from each other according to kinds of lights are displayed on the icon area, respectively.

The light name displayed on the text area includes a first part representing an installed place or an assigned group of the light, and a second part representing a kind of a light.

The location information includes a photo photographed at the actual installation place of the first light.

The setting of the installed location of the first light through the first graphical user interface is performed by touch dragging the information about the first light displayed on the first area to a first location on a photo displayed on the second area.

A light icon corresponding to the first light is displayed on the first location of the photo according to the touch dragging, and the installing location of the first light is set based on a location in an actual space corresponding to the first location on the photo.

The second area includes a name displaying area on which names of a plurality of installing places at which lights are installed are displayed, and a photo displaying area on which a photo photographed at a specific installing place preselected from a plurality of installing places displayed on the name displaying area is displayed.

The touch screen displays a second graphic user interface for controlling the registered light. In addition, the second graphic user interface includes a third area for displaying group information corresponding to a previously registered light group, and a fourth area for displaying location information corresponding to a specific light group preselected from the light groups included in the third area.

The group information displayed on the third area includes a light group icon representing a light group. In addition, the light group icon further includes information about a number of lights belonging to a corresponding light group, and a control tap for batch controlling or separately controlling a light belonging to the corresponding light group.

The light group icon further includes a control tap for batch controlling or separately controlling a light belonging to the corresponding light group.

The location information displayed on the fourth area includes a photo corresponding to an installed place of the specific light group selected through the third area, and light state icons displayed on the photo to represent lights belonging to the selected specific light group.

The light state icons are displayed at positions on the photo corresponding to actual installation locations of each light.

The light state icon represents information about a current operating state of a corresponding light, and the operating state information includes at least one of information about a power state of a light and information about a level of brightness.

According to another embodiment, there is provided a method of controlling a light, which includes detecting unregistered lights and displaying a light list of the detected lights; displaying a first graphical user interface for registering a light preselected from the lights listed in the light list; and storing set register information of the first light through the displayed first graphical user interface.

The first graphical user interface includes a first area for selecting a kind of the selected first light, and a second area for inputting a name of the selected first light.

The first graphical user interface includes a first area on which names of the detected light are displayed, and a second area on which location information for setting installing locations of the lights displayed on the first area is displayed, where the location information displayed on the second area comprises a photo obtained by actually photographing a specific installing place preselected from a plurality of light installed places.

The first area includes a text area for displaying a light name and an icon area for displaying a light icon, wherein the light icon includes a kind icon for representing a kind of a corresponding light.

The method further includes setting an installing location of the selected first light based on the first graphical user interface, wherein the setting of the installing location includes touch dragging the information about the first light displayed on the first area to a first location on the photo displayed on the second area.

In addition, a light icon corresponding to the first light is displayed on the first location of the photo according to the touch dragging, and the installing location of the first light is set at a location in an actual space corresponding to the first location on the photo.

In addition, the method further includes displaying a second graphical user interface for controlling the registered light, wherein the second graphic user interface includes a third area for displaying group information corresponding to a previously registered light group, and a fourth area for displaying location information corresponding to a specific light group preselected from the light groups included in the third area.

The group information displayed on the third area includes a light group icon representing a light group, wherein the light group icon further includes information about a number of lights belonging to a corresponding light group, and one of control taps for batch controlling or separately controlling a light belonging to the corresponding light group.

The location information displayed on the fourth area includes a photo corresponding to an installed place of the specific light group selected through the third area, and light state icons displayed on the photo to represent lights belonging to the selected specific light group, wherein the light state icon is displayed at a position on the photo corresponding to an actually installed location of a corresponding light.

The light state icon represents information about a current operating state of a corresponding light, wherein the operating state information includes at least one of information about a power state of a light and information about a level of brightness.

The method of claim 12, further includes setting a switch to be wirelessly connected to the previously registered light group by displaying a switch setting picture for setting the switch to be wirelessly connected to the previously registered light group, wherein the setting of the switching includes: displaying a switch list; displaying a list of the previously registered lights when a first switch is selected from the switch list displayed, selecting at least one light from the light list displayed, and wirelessly connecting the selected light to the first switch.

According to the embodiment, a light may be conveniently registered through a wireless light technique by using a mobile terminal such as a smart phone, and thus, the operation of the registered light may be easily controlled.

In addition, according to the embodiment, the light corresponding to the light icon is registered by moving the light icon onto the photo of the actual installation place of the light, so that the light may be instinctively disposed while improving convenience of the light registering.

The details of one or more embodiments are set forth in the accompanying drawings and the description below. Other features will be apparent from the description and drawings, and from the claims.

DETAILED DESCRIPTION

The principle of the embodiments will be described below. Therefore, although not specifically described and depicted in the specification, a person having the ordinary skill in the art may realize the principle of the embodiments and may invent various apparatuses within the concept and scope of the embodiments. Further, in principle, conditional terms and embodiments mentioned in the specification shall be obviously intended to understand the concept of the embodiments and may not limit the scope of the embodiments.

Further, it shall be understood that all detailed descriptions, which teach a specific embodiment as well as a principle, an aspect and embodiments, are intended to include structural and functional equivalents. Further, it should be understood that the equivalents may include equivalents to be developed in the future as well as known equivalents and may include all devices invented for performing the same functions regardless of the structure thereof.

The embodiment provides a light system which is capable of registering a plurality of lights by using a light control apparatus and capable of wirelessly controlling the registered lights.

Hereinafter, a light system will be described with reference to FIGS. 1 to 3.

Figure 1:
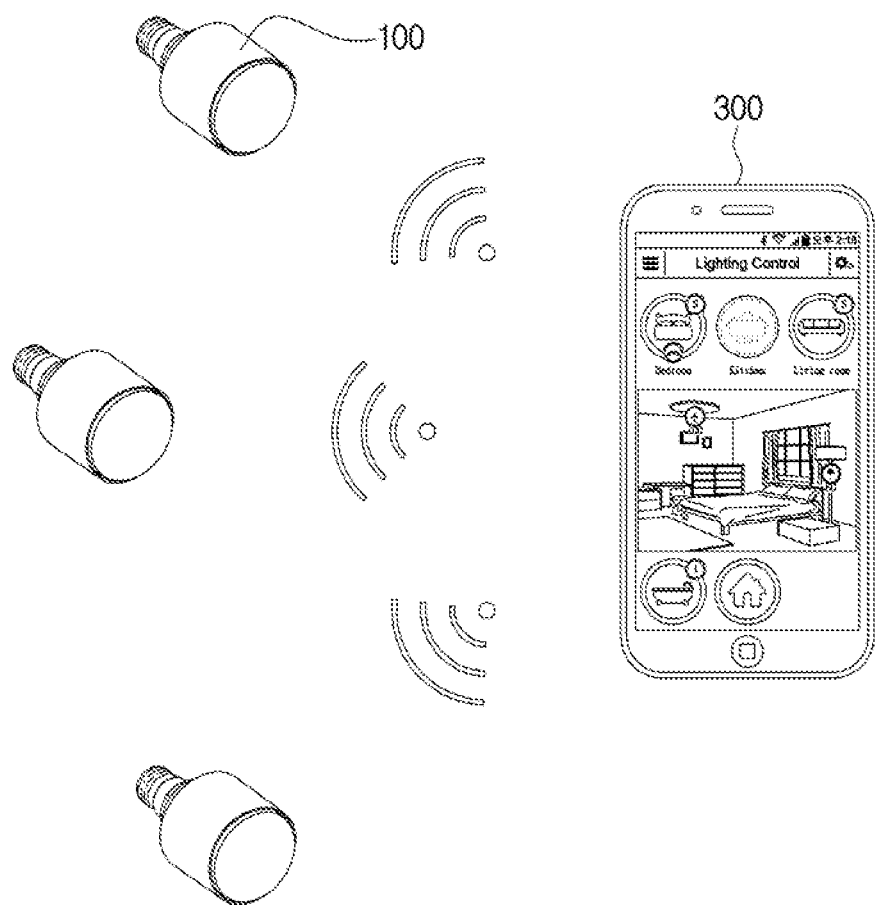
FIG. 1 is a view illustrating a light system according to an embodiment.

FIG. 1 is a view illustrating a light system according to an embodiment. FIG. 2 is a block diagram showing an internal configuration of the light control apparatus depicted in FIG. 1. FIG. 3 is a perspective view showing a detailed structure of the light depicted in FIG. 1.

Referring to FIG. 1, a light system according to the embodiment includes a light control apparatus 300 and a light 100.

The light control apparatus 300 is connected to a plurality of lights 100 through a wireless network.

The light control apparatus 300 stores an application therein and executes the application stored therein to provide a graphical user interface for controlling the lights 100.

In addition, the light control apparatus 300 searches for a unregistered light 100 and provides a graphical user interface for registering the searched light 100 and controlling the operation of the registered light 100.

The light control apparatus 300 may include a terminal which may store and execute the application. The terminal may include at least one of a cellular phone, a smart phone, a laptop computer, a terminal for digital broadcasting, a personal digital assistant (PDA), a portable multimedia player (PMP), and a navigation.

However, the embodiment is not limited to the above, and if an apparatus can perform various wireless communications while downloading and installing an application therein, the apparatus may be included in the light control apparatus 300.

The light 100 is controlled by a dimming device. The light 100 may include at least one light. Preferably, the light 100 may include a plurality of lights.

For example, the light 100 may include a first light installed on a ceiling of a bedroom and a second light mounted on a table in a bedroom.

The light control apparatus 300 serves as input means for receiving a command for controlling the light 100 from a user. The light control apparatus 300 is connected to the light 100 through a wireless network to sends control signal corresponding to the command to the light 100.

The wireless network of the light control apparatus 300 may be determined according to wireless environment.

For example, the light control apparatus 300 wirelessly communicates with the light 100 by applying at least one among ZigBee, Bluetooth and Z-wave thereto.

Figure 3:
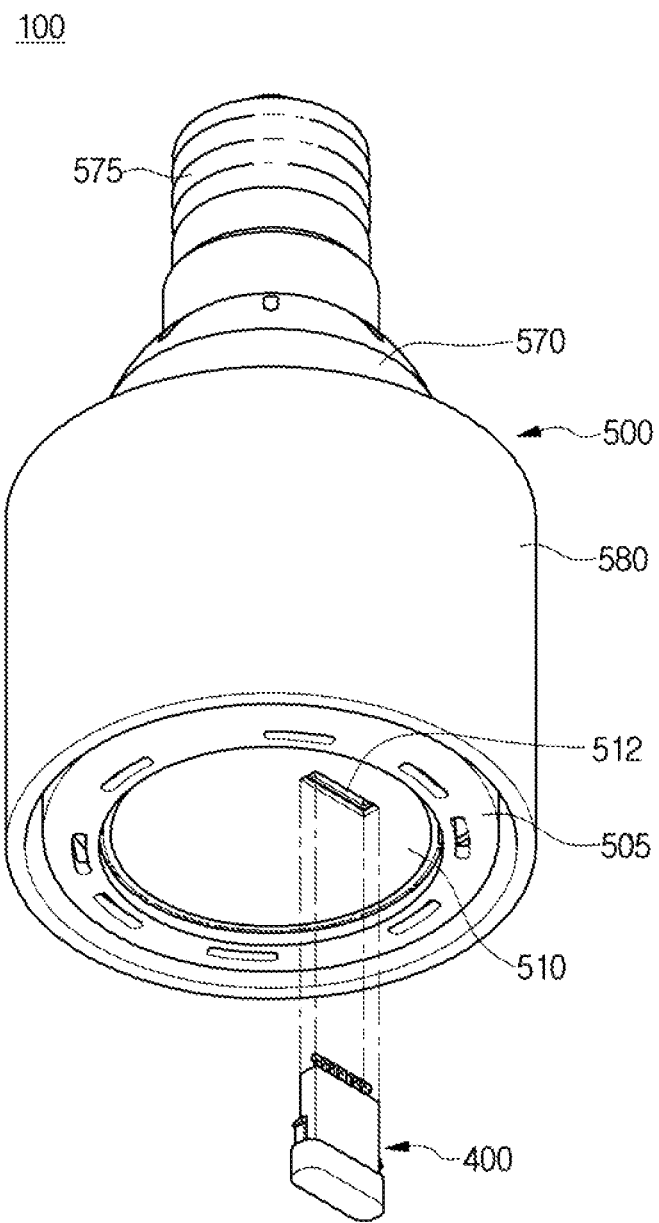
FIG. 3 is a perspective view showing a detailed structure of the light depicted in FIG. 1.

The light control apparatus 300 may be configured as shown in FIG. 3.

Figure 2:
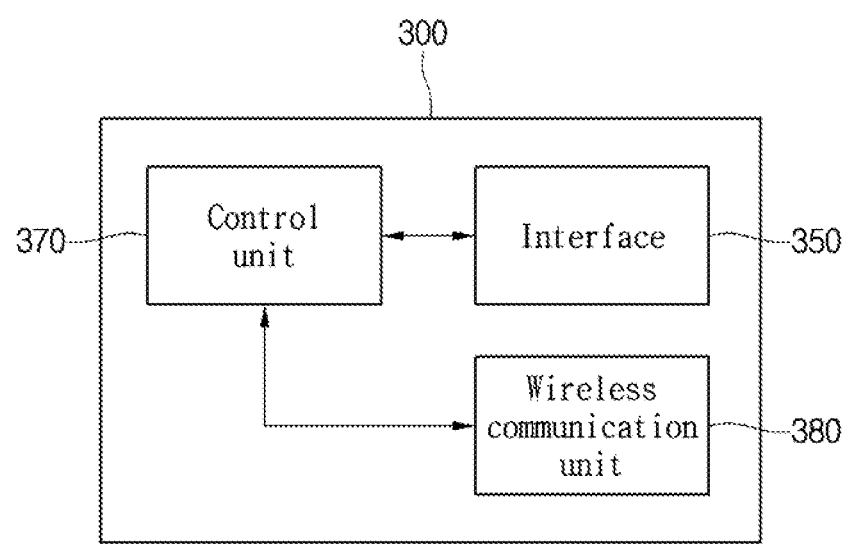
FIG. 2 is a block diagram showing an internal configuration of the light control apparatus depicted in FIG. 1.

Referring to FIG. 2, the light control apparatus 300 may include a control unit 370, an interface 350 and a wireless communication unit 380.

The wireless communication unit 380 may be formed in a main body of the light control apparatus 300 and may serve as a communication module (not shown) including a wireless communication chip supporting the corresponding wireless communication network, which is detachably attached to the main body.

The control unit 370 controls the operation of the light control apparatus 300 by using data stored in a memory.

An operation and communication control program/protocol may be stored in the memory and various applications may be downloaded to be stored in the memory.

The interface 350 may receive a control signal from a user and transfer the control signal to the control unit 370. The interface 350 may include a microphone, a touchable screen and various local buttons.

The control unit 370 provides image data to the interface 350 according to the program stored in the memory and the touch screen of the interface 350 displays an image corresponding to the image data thereon.

When a user provides a selecting signal to the control unit 370 by touching the touch screen or through various schemes well known in the art, the control unit 370 generates image data corresponding to the selecting signal.

The light 100 may be configured as shown in FIG. 3.

The light 100 may include a light module 500 and a communication module 400.

The lighting module 500 includes an inner case 570 having a connecting terminal 575 at an upper portion of the inner case 570 and an inserting part at a low portion of the inner case 570, a heat radiation body (not shown) into which the inserting part of the inner case 570 is inserted, a light emitting module part including a plurality of light emitting devices which emit the light to the bottom surface of the heat radiation body, a guide member 505 coupled to a circumference region of a low portion of the heat radiation body to allow the light emitting module part to be primly fixed to the heat radiation body, a lens 510 formed between the guide member 505 and the light emitting module part, and an outer case 580 outside the heat radiation body.

The lens 510 includes a lens opening part 512 into which the communication module 400 is inserted. The communication module 400 is inserted into the lens opening part 512.

The communication module 400 is connected to the connector of a power control part through the lens opening part 512, such that the control signal transmitted through the light control apparatus 300 is transferred to the light module 500.

Thus, the light system including the plurality of lights 100 which are wirelessly controllable is capable of controlling the lights in real time through the graphical user interface provided through the touch screen of the light control apparatus 300 by executing the application.

To this end, the light control apparatus 300 searches for an unregistered light from the lights installed near thereto through the graphical user interface provided through the touch screen, and performs the operation of registering the searched light.

Hereinafter, the interface 350 of the light control apparatus 300 will be described in detail.

Although the interface 350 may include various interfaces, the interface 350 described below signifies the graphical user interface provided through the touch screen of the light control apparatus 300.

Hereinafter, the steps of registering the unregistered light 100, changing an operating state of the registered light 100, and connecting the switch for controlling the registered light 100 wirelessly to the light 100 by using the graphical user interface provided through the touch screen of the light control apparatus 300 will be described in detail.

First, the step of registering the unregistered light 100 by using the graphical user interface provided through the touch screen of the light control apparatus 300 will be described in more detail.

Figure 4:
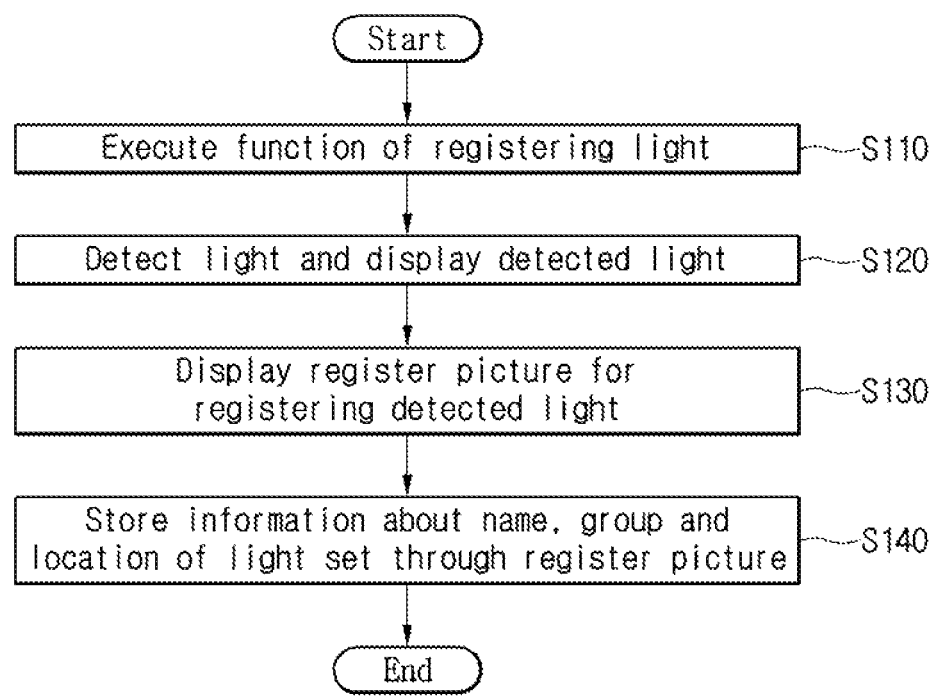
FIG. 4 is a flowchart sequentially illustrating a method of registering a light of a light control apparatus according to an embodiment.

FIG. 4 is a flowchart sequentially illustrating a method of registering a light of a light control apparatus according to an embodiment. FIGS. 5 to 15 are views showing graphical user interfaces provided from the light control apparatus when the light is registered.

Referring to FIG. 4, in step S110, the light control apparatus 300 executes a light registering function according to a request of a user. To this end, the light control apparatus 300 may have stored applications for performing the light register and control therein and may perform the light registering function by executing the stored applications.

Figure 5:
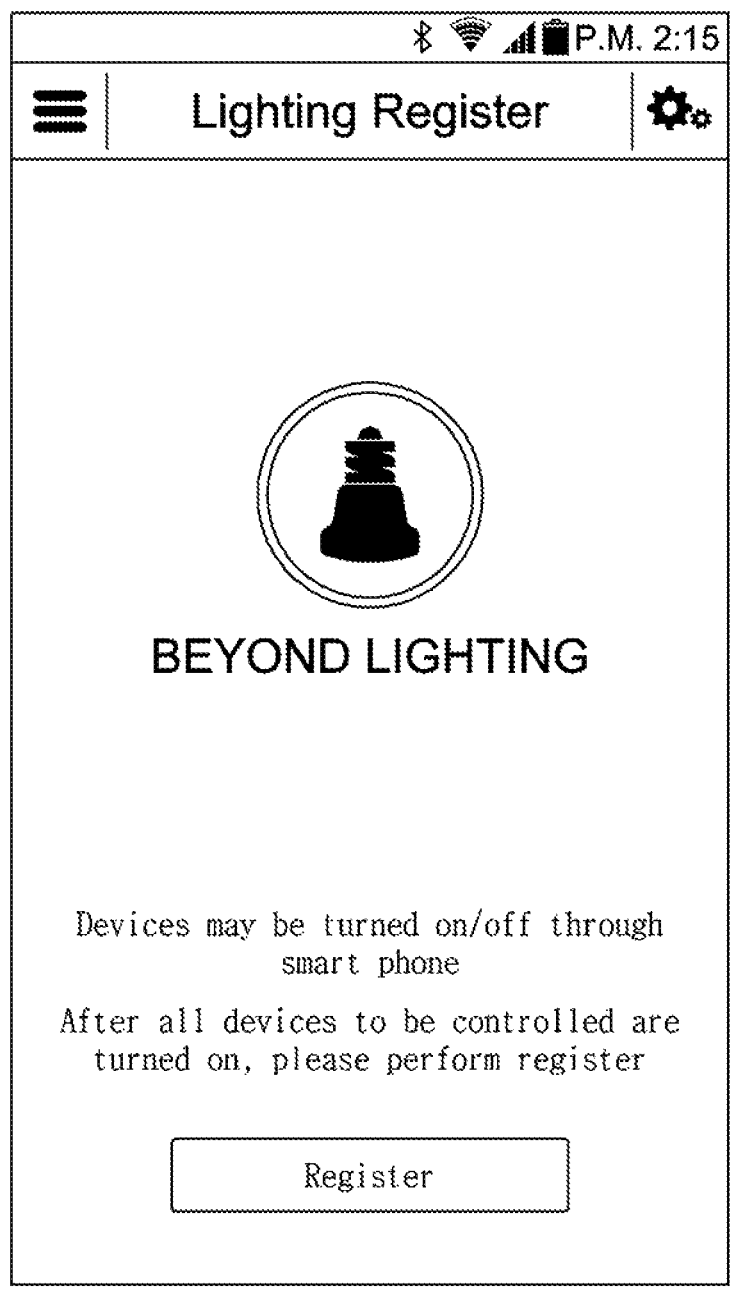
FIGS. 5 to 15 are views showing graphical user interfaces provided from the light control apparatus when the light is registered.

FIG. 5 shows an application execution picture for performing the light registering function according to an embodiment.

Referring to FIG. 5, the execution picture includes a button of 'registering' for starting to perform the step of registering an unregistered light.

When the button of 'registering' on the picture shown in FIG. 5 is selected, the light control apparatus 300 starts to register a light.

FIG. 4 will be described again.

When the button of 'registering' on the execution picture is selected, the light control apparatus 300 searches for an unregistered light from the lights installed near the light control apparatus 300. When the unregistered light is detected, the light control apparatus 300 displays a list of the detected lights in step S120.

In this case, although it has been described above that the light control apparatus 300 searches for the unregistered lights, after the light control apparatus 300 detects all lights distributed near the light control apparatus 300, the light control apparatus 300 may display a list of detected lights in which the lights are sorted into the registered lights and the unregister lights.

Figure 6:
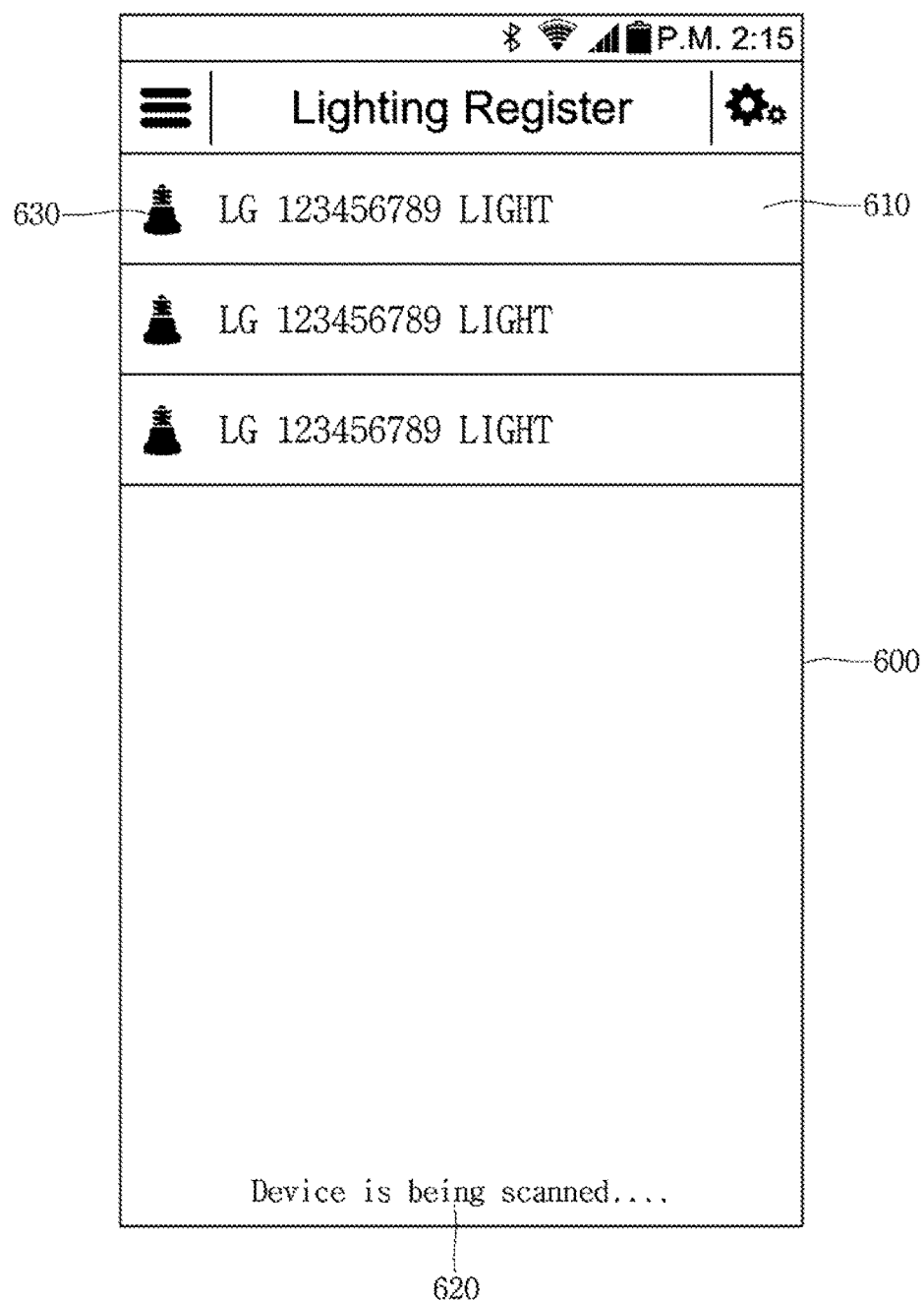

FIG. 6 shows a light searching list.

Referring to FIG. 6, the searching list includes a first area 610 on which information about the lights detected according the searching operation is displayed, and a second area on which information about an operating state is displayed.

The information about a light detected by the light control apparatus 300 among the lights disposed near the light control apparatus 300 is displayed on the first area 610.

In this case, the light information may include an MAC (Media Access Control) address of the detected light.

Although the unregistered lights listed in the first area 610 are depicted in the drawing, the embodiment is not limited thereto. For example, after information about all lights distributed near the light control apparatus is denoted, additional information about whether each of the lights is registered or not may be further denoted beside the denoted light information.

Therefore, a detected device (which may be a light or another kind of device) is displayed on the first area 610.

In this case, the displayed information may further include a name of the detected device and an icon 630 representing a kind of the detected device.

The icon 630 informs a user of whether the detected device is a light, a switch or another kind of device.

The information about a current operating state of the light control apparatus 300 is displayed on the second area 620. That is, since the light control apparatus 300 is currently performing the operation of searching for lights, information about a state of informing that the light control apparatus 300 performs the operating of searching for lights is displayed on the second area 620.

For example, if the light control apparatus 300 is currently in the state of searching for lights, a message for informing that light control apparatus 300 is currently in the state of searching for lights may be displayed on the second area 620. For example, a message of 'device is being scanned' may be displayed.

In addition, when the operation of searching for lights is completed, the number of lights detected through the searching operation may be further displayed together with a message of 'Device scanning is completed'.

FIG. 4 will be described again.

When a specific light is selected from the searching list 600, the light control apparatus 300 displays a register picture for registering the selected light in step 130.

In this case, the register picture may include various menus for providing functions of setting a name of the selected light, assigning the selected light to a group, and setting an actually installed location of the selected light.

Then, when register information about the selected specific light is input through the register picture, the light control apparatus 300 stores information about the name of the light, the group and the installed location input through the register picture in step S140.

Hereinafter, the register picture will be described in more detail.

The display of the register picture begins by selecting specific one (hereinafter, referred to as 'first light') from the lights denoted in the list.

Figure 7:
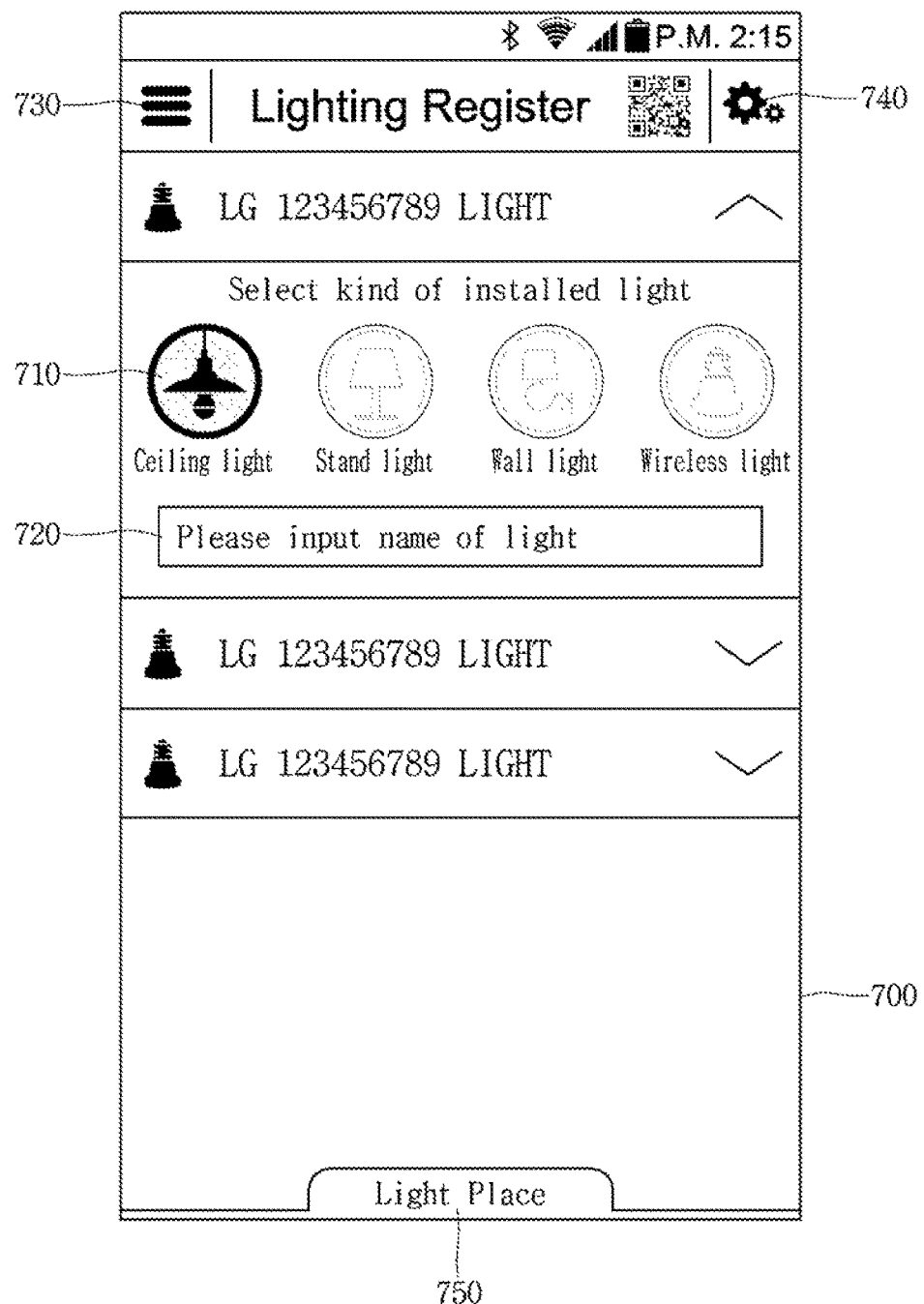

Referring to FIG. 7, when the first light is selected from the searching list 600, the register picture 700 is displayed for performing a process of registering the first light.

The register picture 700 includes a first area 710 for setting a kind of the selected first light, a second area 720 for inputting a name of the selected first light, a third area 730 on which a menu icon for representing a plurality of menu items for performing a register operation is displayed, a fourth area 740 on which an icon for storing information about the register of the first light is displayed, and a fifth area 750 on which a menu for setting the actually installed location of the selected first light is displayed.

Each kind icon representing kinds of lights is displayed on the first area 710 to allow the kind of the selected first light to be set.

For example, a first kind icon representing a ceiling light, a second kind icon representing a stand light, a third kind icon representing a wall light, and a fourth kind icon representing a wireless light may be displayed on the first area 710.

Thus, a user may select one from the displayed kind icons to set the kind of the selected first light.

A name input window for setting the name of the selected first light is displayed on the second area 720.

The user may input a name of the selected first light into the name input window of the second area 720.

In this case, the name of a light may include a first part having information about an installed location of the light and an assigned group and a second part having a kind of light.

Thus, when the user sets the installed location, the assigned group and the kind of the selected first light, the light control apparatus 300 automatically sets the name of the selected first light. Meanwhile, a group of lights may correspond to a place at which the lights are actually installed. For example, the lights installed in a bedroom may be assigned to the same group, the name of which may have 'bedroom'.

Thus, when the first light is installed in a bedroom, the group to which the first light is assigned has the name of 'bedroom' and the first light is classified into a ceiling light, the name of the first light may be automatically set as 'bedroom ceiling light'.

Meanwhile, the menu displayed on the fifth area 750 is a menu for disposing the first light at the actually installed location of the first light. In this case, the disposing of the first light may be performed by using a photo photographed at the actual installation place of the first light.

As described above, when the kind and name of the first light are set, the information about the first light in the searching list is changed based on the set kind and name of the first light.

Figure 8:
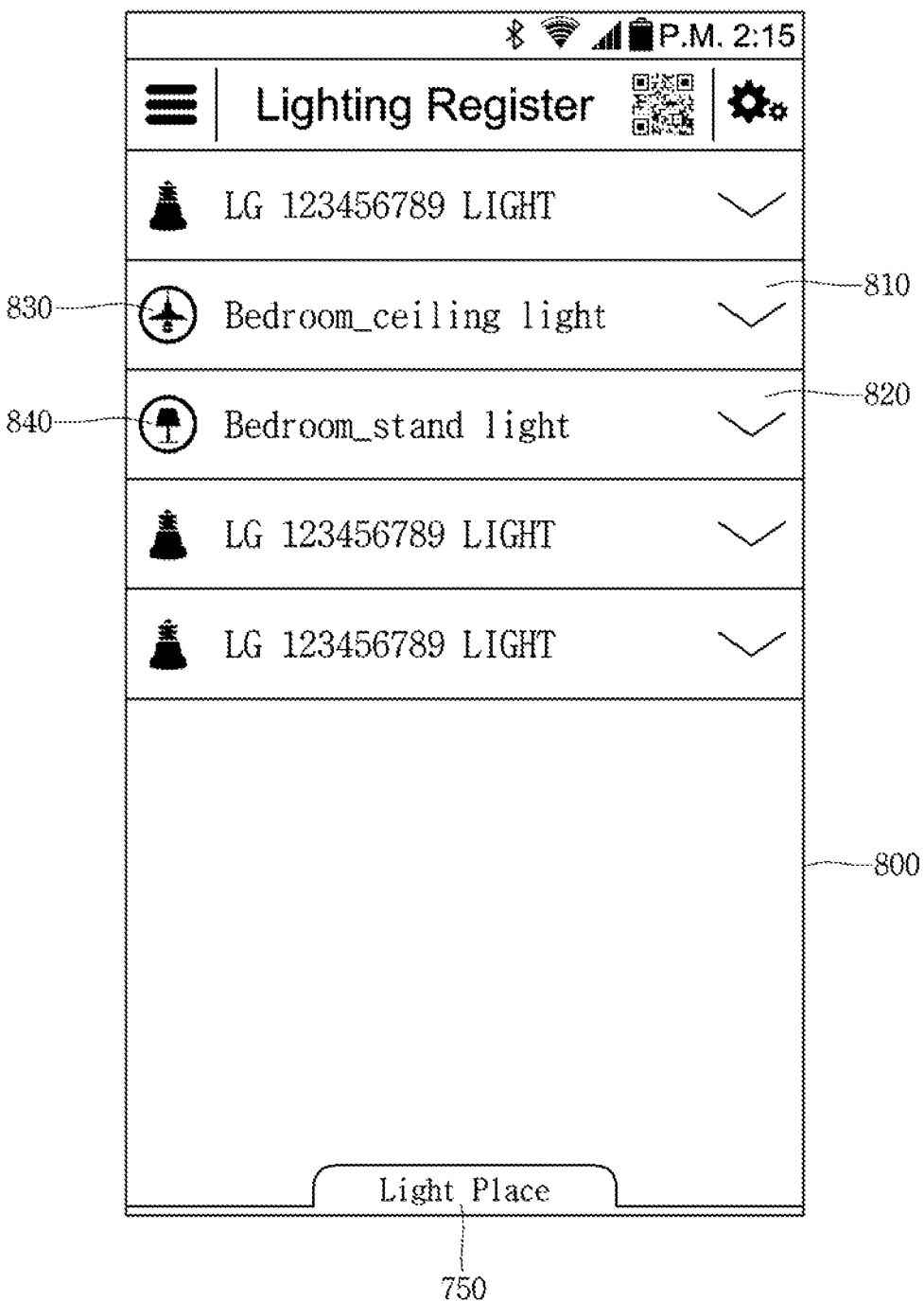

Referring to FIG. 8, when the operation of setting the register information (kind and name) about at least one of the light in the searching list is completed, the information about the light of which the setting operation is completed is changed into the register information.

That is, the information about the first light in the register picture 800 is changed into the register information set through the graphical user interface shown in FIG. 7.

In this case, the changed information about the first light includes a text 810 representing the name of the first light and a kind icon 830 informing of the kind of the first light.

In addition, when register information about another light (second light) is set as well as that of the first light, the information about the second light includes a text 820 representing the name of the second light and a kind icon 840 informing of the kind of the second light based on the register information set through the graphical user interface of FIG. 7.

In this case, the first light may be a ceiling light installed in the bedroom and the second light may be a stand light install in the bedroom.

As known based on the set register information, the first and second lights have been installed in the bedroom which is the same space of the entire space in which the lights are installable.

When the operation of setting the register information about the name and kind of the first light is completed as described above, the information about the actually installed location of the first light may be set.

This may be performed through a location setting menu included in the pictures of FIGS. 7 and 8.

When a menu for setting the actually installed location of the first light is selected in a state that the first light is selected, a picture for setting the actually installed location of the first light is displayed.

Figure 9:
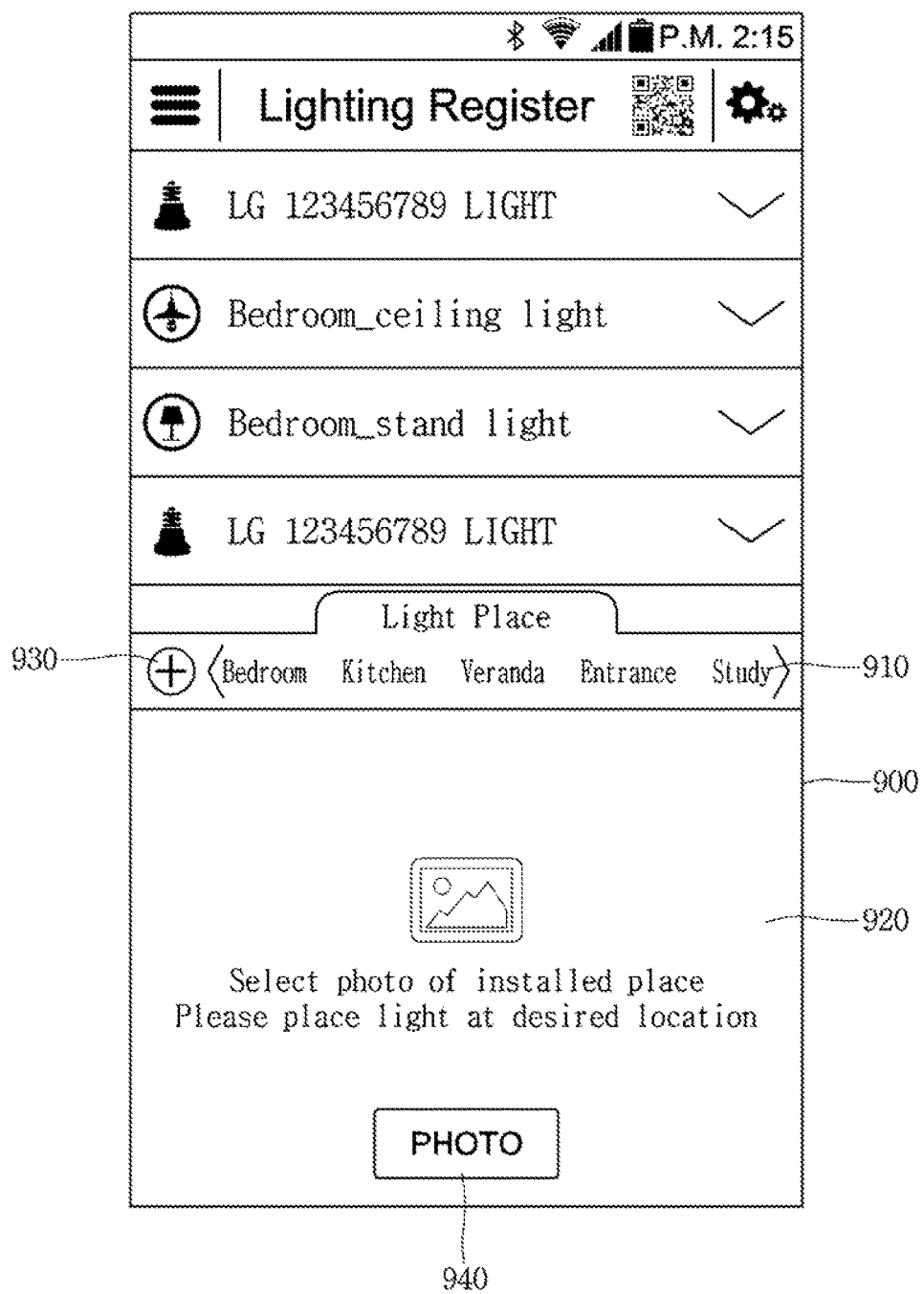

Referring to FIG. 9, the picture 900 for setting the actually installed location of the first light includes a first area 910 on which a menu for selecting the installed location of the selected first light is displayed, and a second area 920 on which a photo corresponding to an installed place selected from the first area 910 is displayed.

A list of previously registered places among the places at which light may be installed is displayed on the first area 910. In this case, photos photographed at places corresponding to the previously registered places have been stored in the light control apparatus 300.

For example, the previously registered places may include a bedroom, a veranda, an entrance and a study. In addition, the photos obtained by actually photographing each place have been registered and stored in the light control apparatus 300.

Meanwhile, a menu 930 for registering a new place is further displayed on the picture 900.

That is, when the place at which the first light is actually installed is not registered, the user may register the actual installation place of the first light by using the menu 930.

Figure 10:
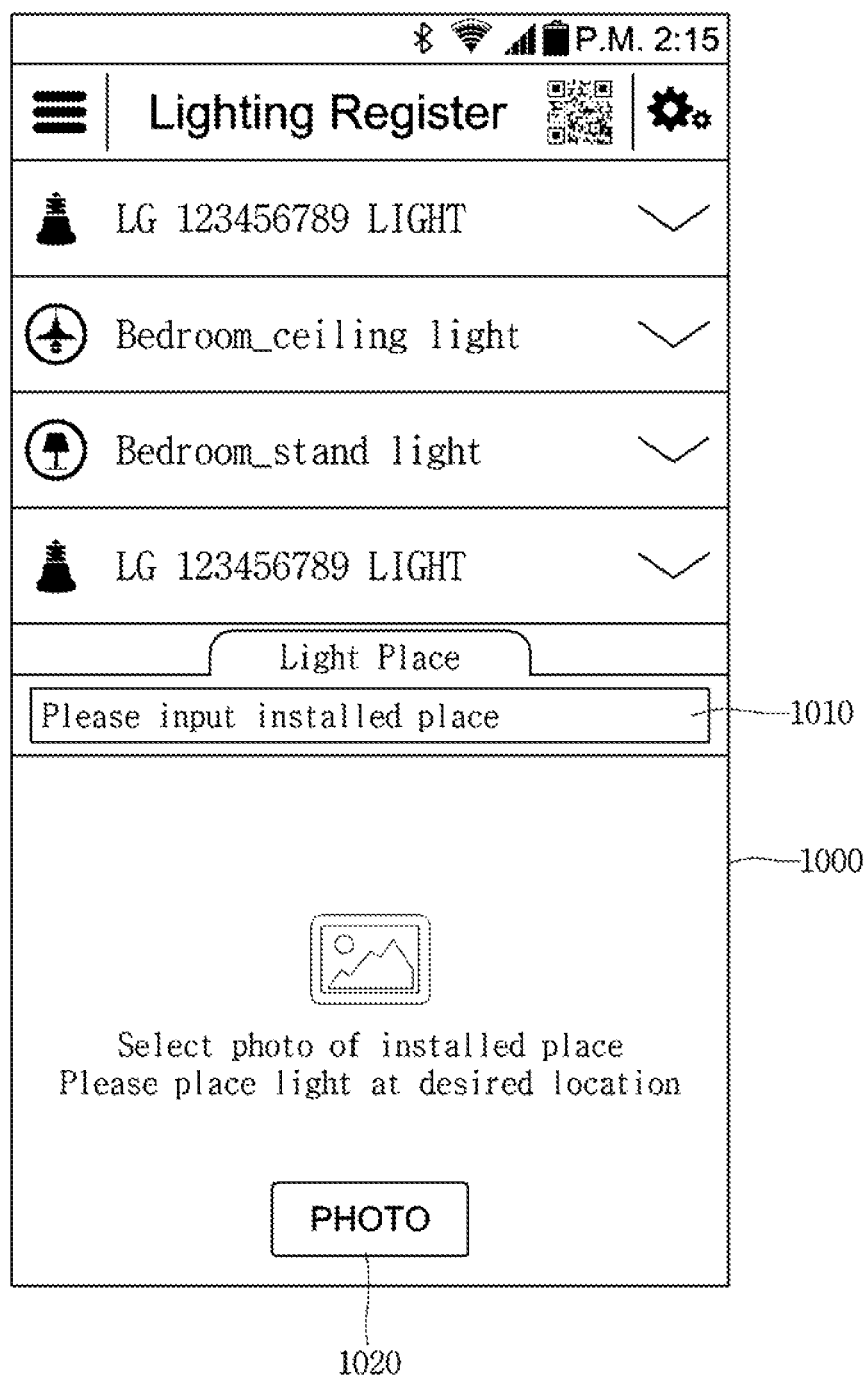
Figure 11:
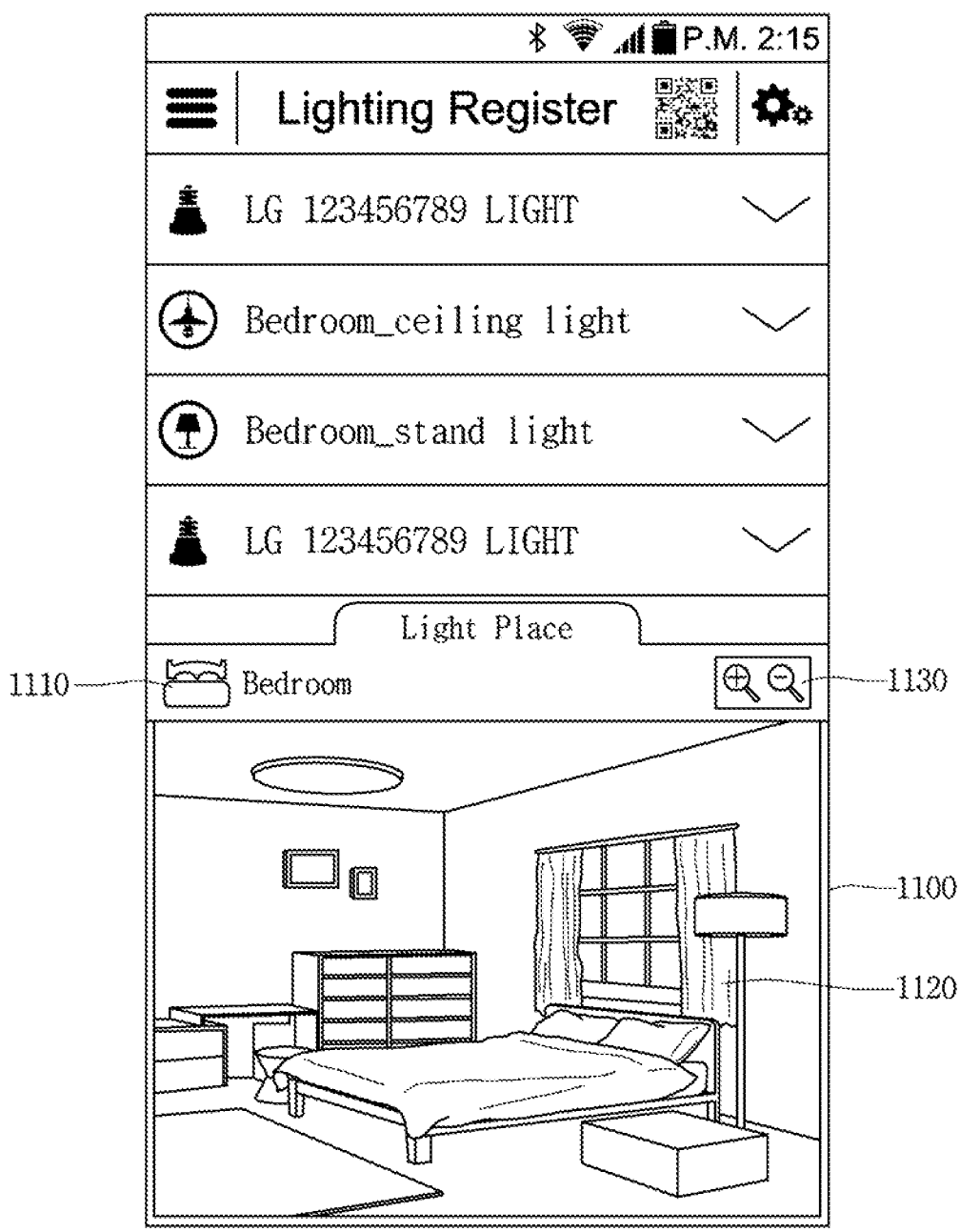

Referring to FIG. 10, when the menu 930 is selected on the picture 900 to register the new installing place, the light control apparatus 300 allows a picture 1000 for registering the new installing place to be displayed.

The picture 1000 includes a first area 1010 on which a name input window for inputting the name of an installing place to be first registered is displayed, and a second area 1020 on which a menu for registering a photo corresponding to the new installing place is displayed.

A user may input the name of a new installing place to be first registered into the first area 1010.

In addition, when the menu displayed on the second area 1020 is selected in the state that the name is input, the light control apparatus 300 moves to a photo gallery to display the previously stored photos.

When one photo is selected from the displayed photos, the light control apparatus 300 registers the selected photo as a photo of the newly registered installing place.

Meanwhile, when one place is selected from the previously registered installing places on the picture 900, the light control apparatus 300 displays a picture 1100 including a photo corresponding to the selected installing place.

The picture 1100 includes a first area 1110 on which information including at least one of the name and icon of the selected installing place is displayed, a second area 1120 on which a photo corresponding to the selected installing place is displayed, and a third area 1130 on which a menu for changing a size of the photo displayed on the second area 1120.

The information about the selected installing place is displayed on the first area 1110.

The information about the installing place may include a text part on which the name of the installing place is displayed and an icon part on which a place icon corresponding to the installing place is displayed.

The photo corresponding to the selected installing place is displayed on the second area 1120. Preferably, the photo is obtained by actually photographing the selected installing place.

In this case, the photo displayed on the second area 1120 may be a photo previously registered corresponding to the selected installing place.

To the contrary, when any previously registered photos corresponding to the selected installing place do not exist, the display photo may be a photo selected from the gallery introduced by the input of the menu 940 for selecting a photo.

Meanwhile, although a photo is displayed on the second area 1120, when any photos corresponding to the selected installing place do not exist, a template may be displayed instead of the photo.

In this case, the photo displayed on the second area 1120 includes a photo of a light actually installed at the second area 1120. Thus, by using the photo displayed on the second area 1120, the installing place of the light desired to be registered may be easily set.

A menu for changing a size of the photo displayed on the second area 1120 is displayed on the third area 1130.

The menu displayed on the third area 1130 includes an enlarging menu for enlarging a size of the photo, and a reducing menu for reducing the size of the photo.

The enlarging menu is a menu for enlarging a specific area of the photo displayed on the second area 1120 at a preset rate, and the reducing menu is a menu for reducing the entire size of the photo at a preset rate.

In a state that the photo is displayed as described above, the user may set the installed locations of the lights listed in the list.

The setting of the installed location of a light is performed by moving an icon of one of the lights listed in the list to a specific area of the photo displayed on the second area 1120.

The process of setting an installed location of a light will be described in more detail.

Figure 12:
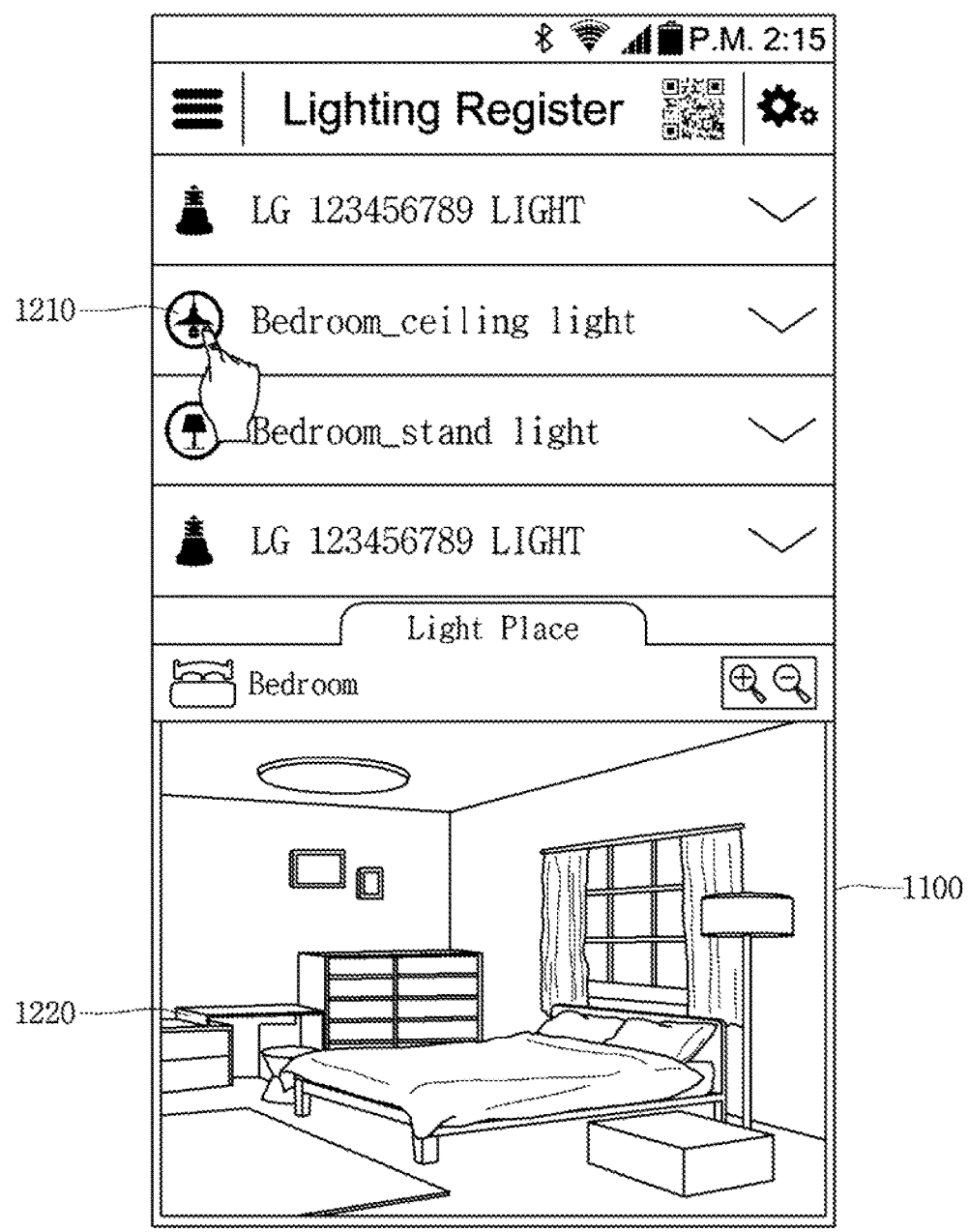

Referring to FIG. 12, in the state that the picture described above is displayed, the user touches one (a first light) 1210 of the lights listed in the list.

In this case, a photo 1220 corresponding to the installed place of the first light is displayed on the picture.

Figure 13:
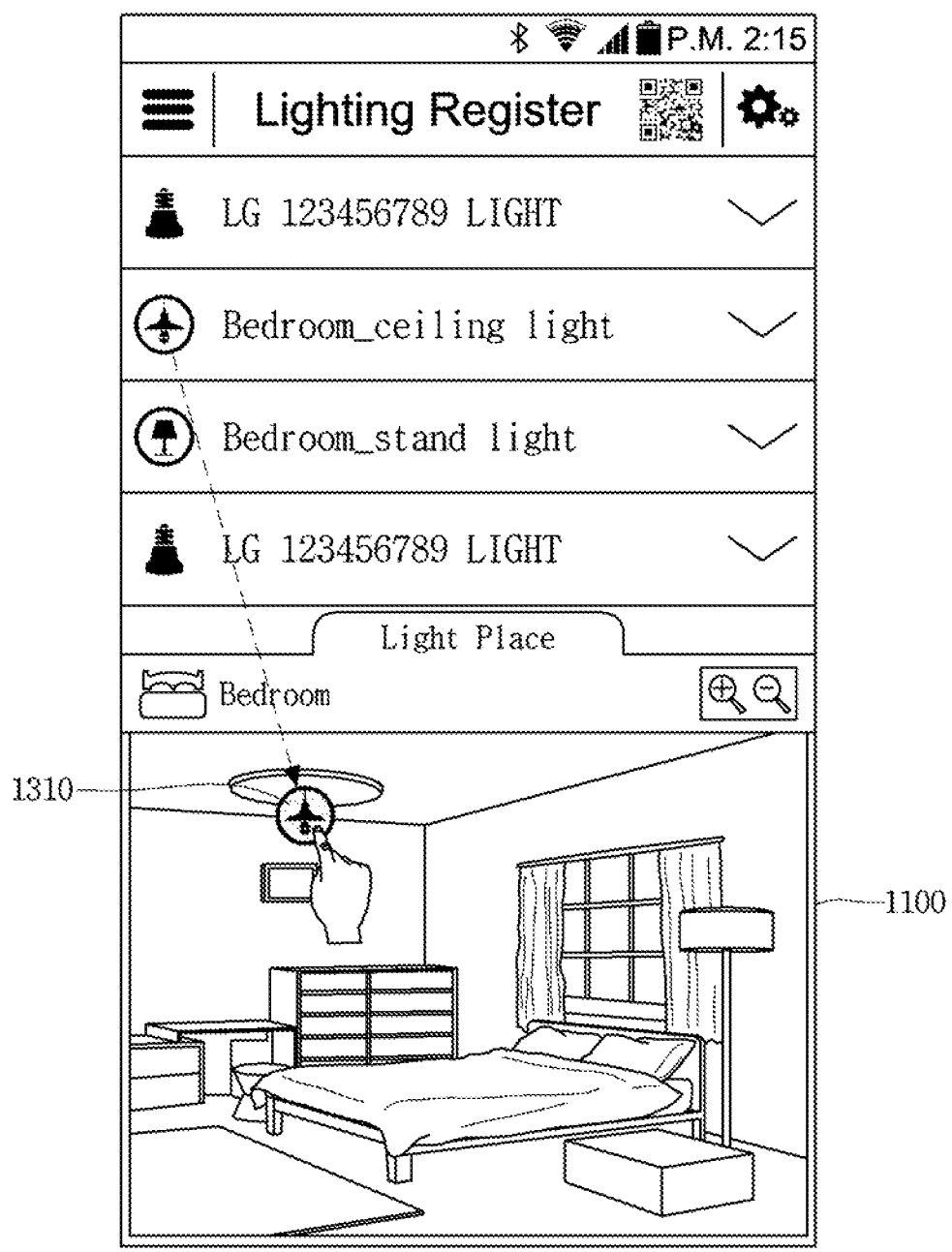

Thereafter, referring to FIG. 13, in the state of touching the first light, the touch point is dragged to an area on which the photo 1220 is displayed.

In this case, when the dragging operation is completed, an icon (which may be a kind icon) of the first light moves to the dragged point.

Then, when the user drags the icon of the first light to the actually installed location of the first light on the photo 1220 such that the icon of the first light moves to the actually installed location, the user releases the touch.

When the touch is released (drag and drop), the icon 1310 of the first light moves to the released point of the touch In this case, the light control apparatus 300 sets the actual location to which the icon of the first light moves on the photo as the installed location of the light.

Meanwhile, a photo of the light actually installed at the corresponding place is included in the photo, so that the user may move the icon of the first light to a specific location on the photo. Thus, the user may easily set the installed location of the first light.

In this case, the first light is classified into a group corresponding to the place at which the first is installed.

Figure 14:
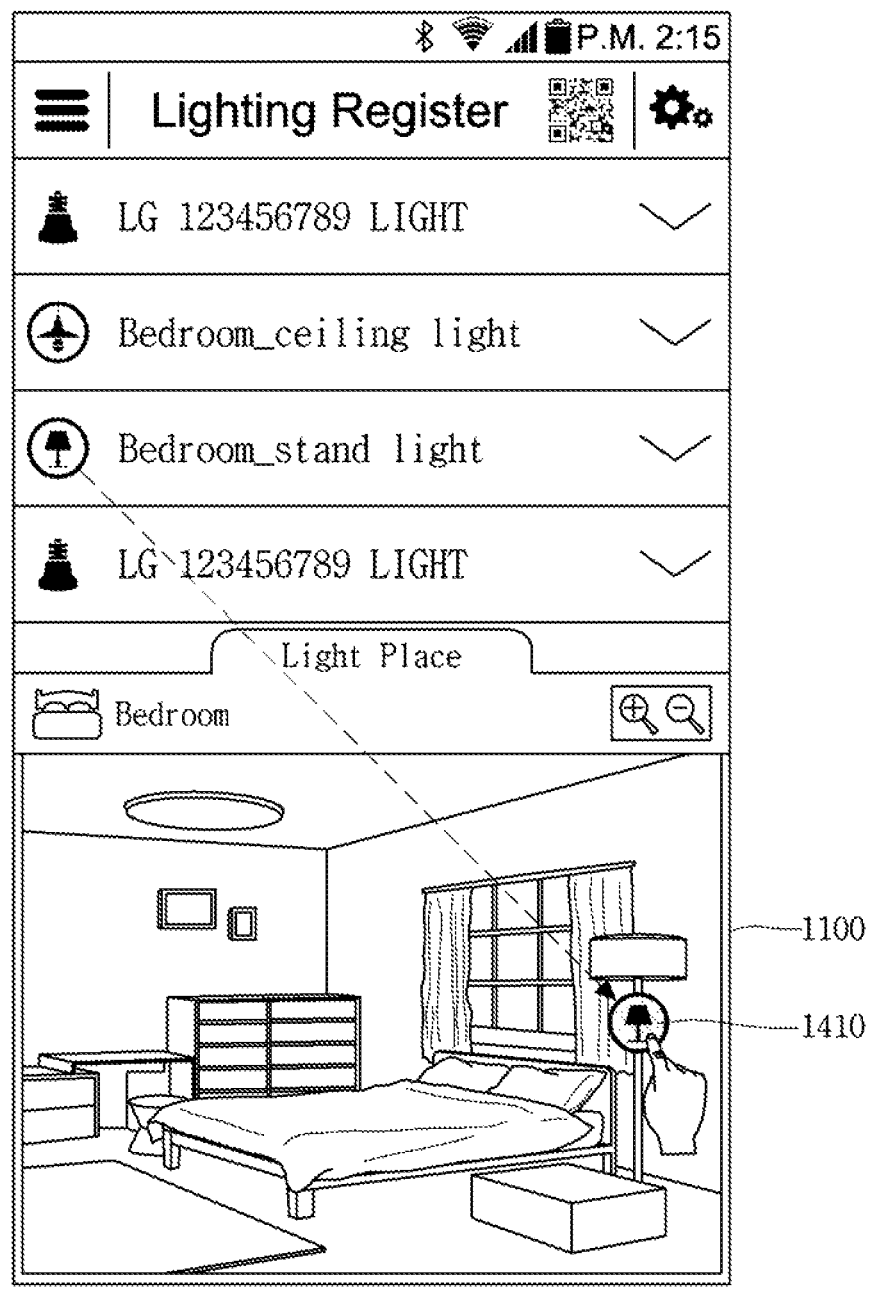

Meanwhile, referring to FIG. 14, in the state that the picture is displayed as described above, an icon 1410 of the second light, which is installed at the same place as the first light, may be moved to a specific location on the photo in the same manner as that of the first light.

In this case, the installed locations of the first and second lights are set in the state that the photo of the same installed place is displayed. This means that the first and second lights are installed at the same place.

Figure 15:
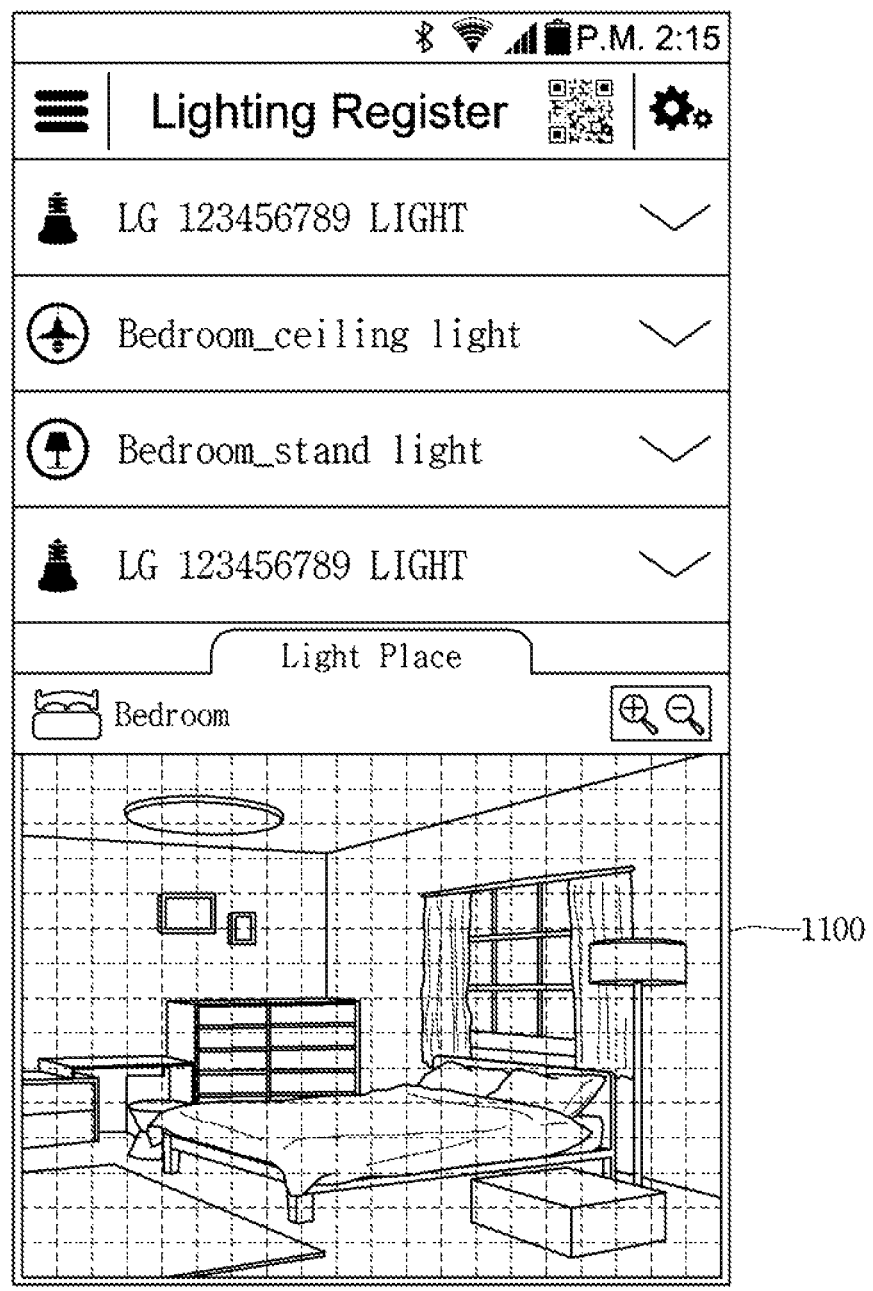

Meanwhile, as shown in FIG. 15, the photo displayed on the picture is divided into a plurality of areas. This is for the purpose of exactly moving the icon of a light to a specific area corresponding to an actually installed location in the entire area of the photo.

Thus, the first and second lights are grouped into the same group. In this case, a name of the light group to which the first and second lights belong may be 'bedroom'.

As described above, the method of registering a light according to the embodiment includes setting an installed location by moving the icon to a specific area of the photo in the state that the photo photographed at the installed place of the light, and then, inputting register information about a name or kind of the light.

Hereinafter, a process of changing an operating state of the registered light 100 by using a graphical user interface provided through the touch screen of the light control apparatus 300 will be described in more detail.

Figure 16:
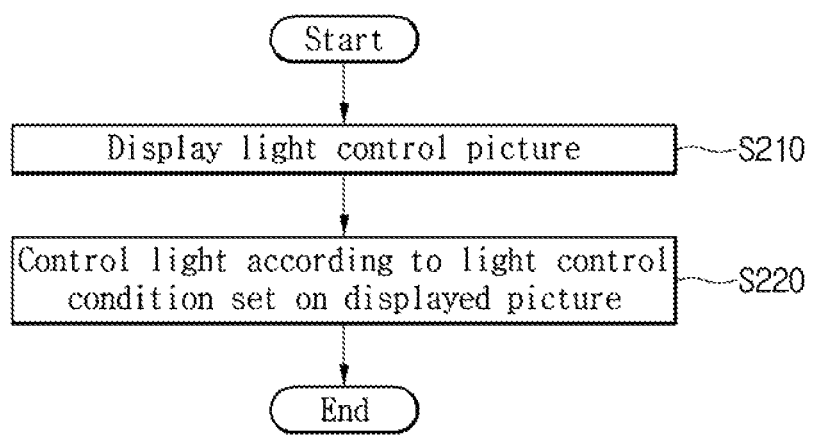
FIG. 16 is a flowchart sequentially illustrating a control method of a light control apparatus according to an embodiment.

FIG. 16 is a flowchart sequentially illustrating a control method of a light control apparatus according to an embodiment. FIGS. 17 to 21 are views showing a light control picture according to an embodiment.

First, as described above, a plurality of lights are disposed at specific areas of photos corresponding to the installed places, so that the setting and registering of the installed locations are performed.

In addition, among the registered lights, the lights disposed in the same photo means that the lights are installed at the same place, and thus, the lights are grouped into the same light group.

In addition, each of the registered lights includes register information including information about a kind of light informing of whether the corresponding light is a ceiling light or a wall light and a light name for distinguishing the corresponding light from any other lights.

The information about the registers and installing locations of the registered lights is stored in the light control apparatus 300.

In addition, referring to FIG. 16, in step S210, the light control apparatus 300 displays a light control picture for controlling previously registered lights according to a request from an outside.

Figure 17:
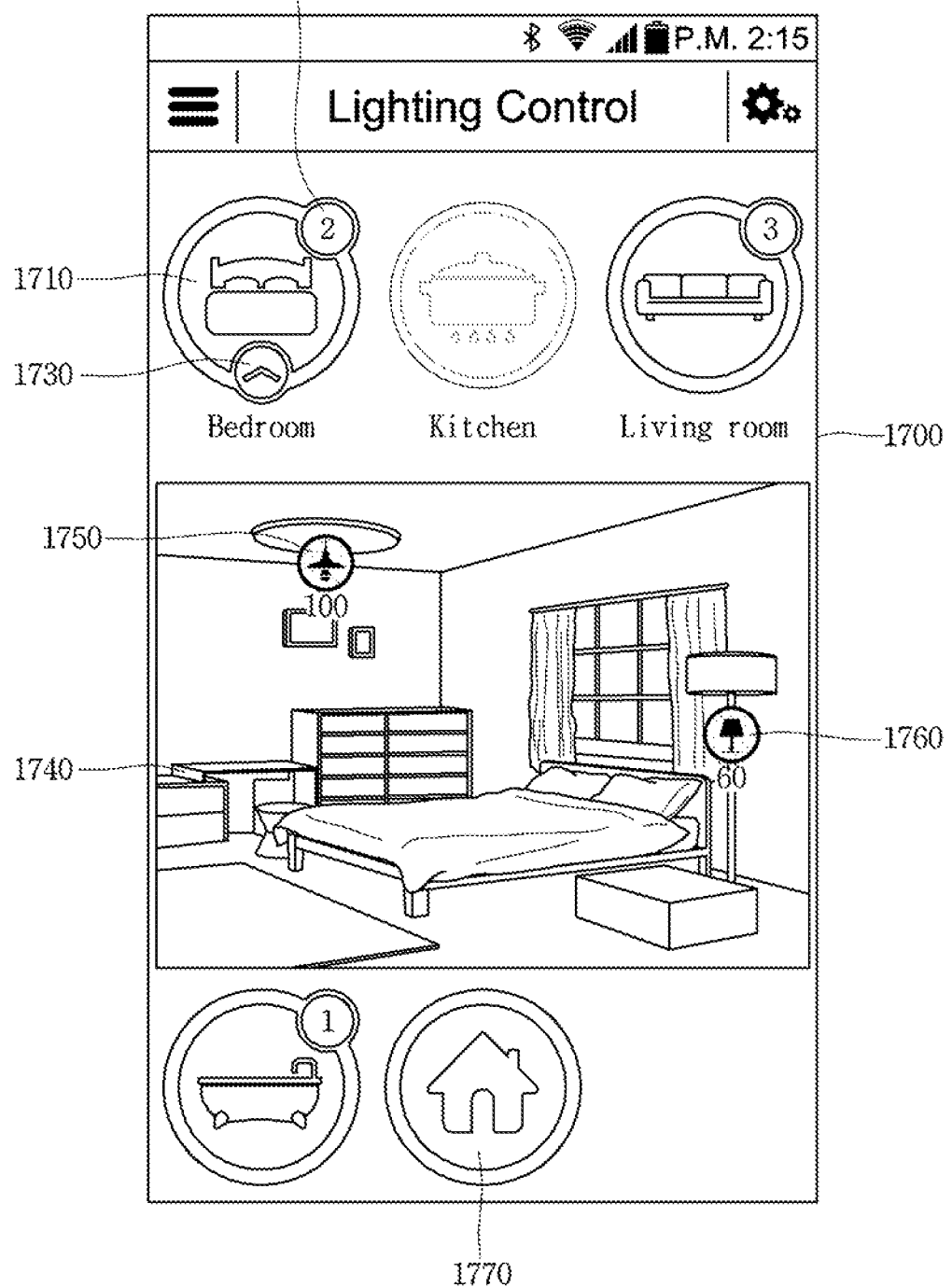
FIGS. 17 to 21 are views showing a light control picture according to an embodiment.

FIG. 17 shows an initial picture of the light control picture according to an embodiment.

Referring to FIG. 17, the light control picture 1700 includes a first area on which a light group icon 1710 for selecting at least one group previously registered is displayed, and a second area 1740 on which location information 1740 corresponding to one specific group icon preselected from the light group icons 1710 is displayed.

The light group icon 1710 represents a previously registered light group. The light group icon 170 is displayed corresponding to the number of previously registered light groups. For example, as shown in FIG. 17, when bedroom, kitchen, living room and bathroom groups exist as the previously registered light groups, the light group icon 1710 includes a first icon corresponding to the bedroom group, a second icon corresponding to the kitchen group, a third icon corresponding to the living room group, and a fourth icon corresponding to the bathroom group.

The light group icon 1710 includes information about a text representing a name of the corresponding light group.

The light group icon 1710 is displayed in mutually different forms according to whether the light belonging to the corresponding light group exists. For example, when a previously registered light exists in the bedroom group, the light group icon corresponding to the bedroom group is displayed while being activated. However, when any previously registered lights do not exist in the kitchen group, the light group icon corresponding to the kitchen group is displayed while being inactivated.

Each of the light group icon 1710 includes information about the number of lights belonging to the corresponding group and an individual control tap 1730 for individually controlling the lights belonging to the corresponding group.

Thus, the user may easily recognize the number of lights belonging to the group based on the light group icon 1710.

In addition, the user can batch control the lights belonging to the same group by using the individual control tap 1730. To the contrary, the user can batch control the lights belonging to the same group.

The location information corresponding to the light group preselected from the light group icons is displayed on the second area. The location information includes a photo photographed at the installed place of the corresponding light group.

That is, the location information includes a photo photographed at the installed place of the light group. In addition, when a light belonging to the corresponding light group exists, at least one light icon is displayed on the photo. The light icon is displayed on a specific area corresponding to the actual installation place of the corresponding light on the photo.

FIG. 17 shows a case that the bedroom light group icon is selected from the light group icons. As the bedroom light group icon is selected, the photo of the bedroom is displayed on the second area.

In addition, an icon representing the lights belonging to the bedroom group is displayed on the photo.

As shown in FIG. 17, the light belonging to the bedroom group includes a ceiling light installed on a ceiling and a stand light installed on a table.

Thus, a first light icon 1750 representing the ceiling light is displayed on a first area of the photo and a second light icon 1760 representing the stand light is displayed on a second area of the photo.

The first area of the photo corresponds to the actually installed location of the ceiling light in the corresponding bedroom, and the second area corresponds to the actually installed location of the stand light in the bedroom.

The light icon displayed on the photo includes information about an operating state of the corresponding light.

The operating state information includes a power state of the corresponding light. For example, when the power of the ceiling light disposed in the bedroom is turned on, the first light icon 1750 represents a color informing of the state that the corresponding light is turned on. That is, as shown in the drawings, the first light icon 1750 is displayed in orange.

In this case, it is preferable to allow the color of the first icon 1750 to correspond to a color of light radiated from the corresponding light. For example, when the light generated from the light corresponding to the first light icon 1750 is white in color and is powered on, the first light icon 1750 is displayed in white. Differently from the above, when the light generated from the light corresponding to the first light icon 1750 is blue in color and is powered on, the first light icon 1750 is displayed in blue. Differently from the above, when the light corresponding to the first light icon 1750 is powered off, the first light icon 1750 is displayed in black or gray.

Meanwhile, the light icon includes information about the brightness of light. The brightness information may be a numeral representing a level of brightness of the corresponding light and be displayed on the photo representing the location information together with the light icon.

As shown in FIG. 17, the ceiling light of the bedroom is operated at the brightness level of 100% and the stand light of the bedroom is operated at the brightness level of 60%.

Again, FIG. 16 will be described below.

In step S220, the light control apparatus 300 controls the operation of a corresponding light according to a light control condition set on the light control picture 1700.

The light control apparatus 300 may batch control the plurality of lights belonging to a corresponding light group in units of light groups. To the contrary, one specific light among the lights belonging to a specific light group may be individually controlled.

That is, when at least one light group is selected through the light control picture 1700 shown in FIG. 17, a control picture for setting the operations of the lights belonging to the selected light group.

In addition, the user may individually control the light corresponding to a specific light icon by selecting a light icon corresponding to the specific light from the location information included in the control picture. Differently from the above, the user may batch control a plurality of lights belonging to the light group through an input such as a long touch or short double-touch of the light group icon.

Meanwhile, a home icon 1770 is displayed on the light control picture 1700.

The home icon 1770 is a button for batch controlling all the lights belonging to all the light groups at once.

When the home icon 1770 is selected, the light control apparatus 300 changes the powering states of all the lights belonging to all the light groups either from power-on states to power-off states or from power-off states to power-on states.

To the contrary, when the home icon 1770 is selected, the light control apparatus 300 displays an additional menu picture for setting a level of brightness and batch controls all the lights belonging to all the light groups by applying the level of brightness set through the menu picture.

Figure 18:
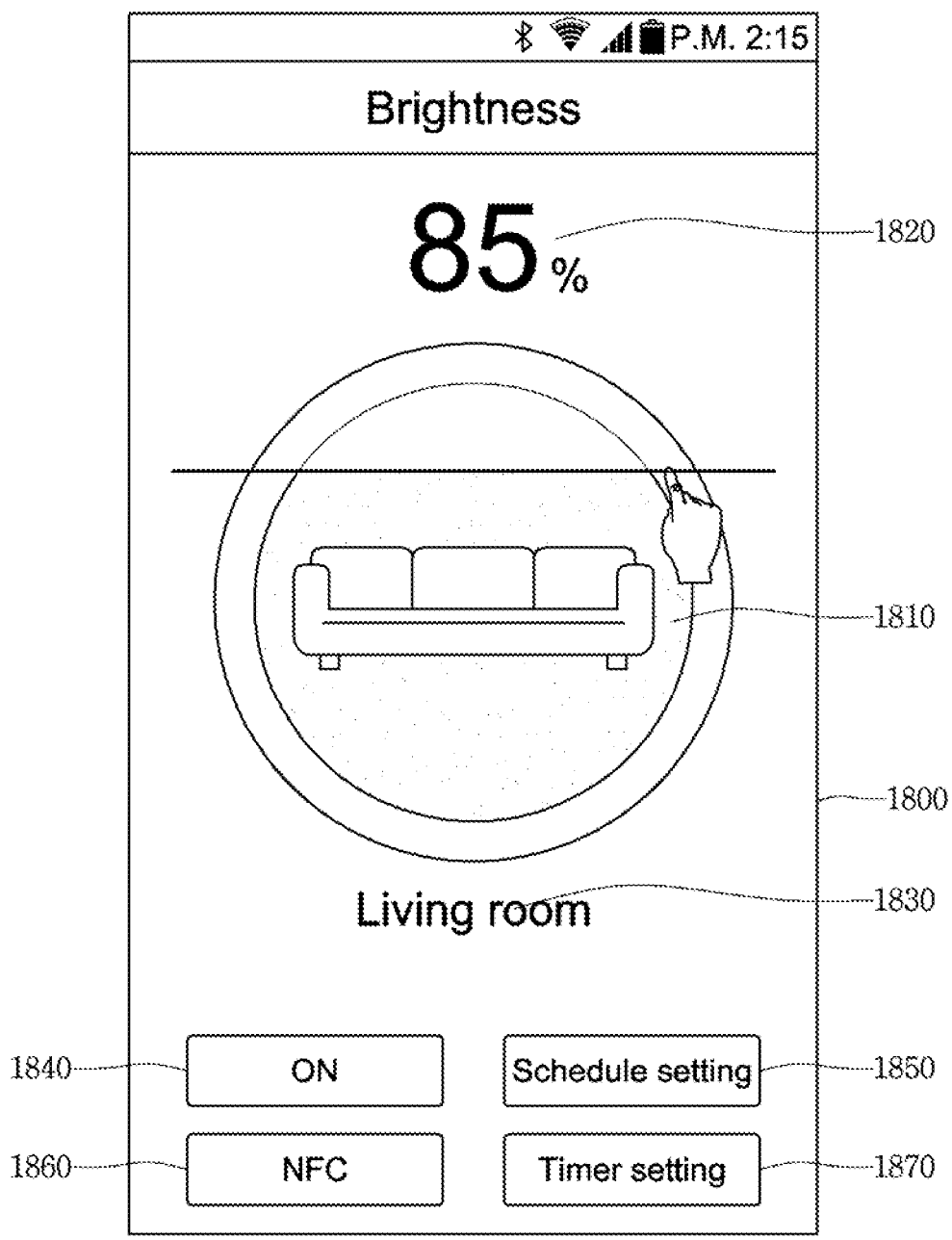

FIG. 18 shows a detail condition setting picture for a light according to an embodiment.

The detail condition setting picture may be displayed when a specific light icon or a specific light group icon is selected through the light control picture 1700 shown in FIG. 17.

In this case, the selecting of the specific light icon or the specific light group icon may be performed through a short double-touch.

Referring to FIG. 18, the detail condition setting picture 1800 includes a brightness level setting area 1810 for setting a level of brightness, a brightness level displaying area 1820 for displaying a currently set level of brightness, a light information displaying area 1830 for displaying information about a currently selected light, a power control area 1840 for controlling power of the currently selected light, a schedule setting area 1850 for setting a schedule of the currently selected light, an NFC area 1860 for turning on or off an NFC function of the currently selected light, and a timer setting area 1870 for setting a timer of the currently selected light.

The brightness level of the currently selected light may be set through the brightness level setting area 1810. In this case, the information about the selected light is displayed on the light information displaying area 1830.

In this case, the light information displayed on the light information display area 1830 may be about the light group to which a plurality of lights belong or differently therefrom, about one specific light belonging to a specific light group.

In other words, the brightness level setting area 1810 may be an area for batch setting levels of brightness of the lights belonging to a specific light group, or differently therefrom, may be an area for individually setting one specific light belonging to a specific light group.

The brightness level setting area 1810 may be provided in a form of a brightness control gauge and may set a level of brightness by moving up and down the light control gauge after touching the light control gauge.

In addition, as the level of brightness is controlled, the state of the brightness control gauge of the brightness level setting area 1810 is changed. That is, an area positioned at an upper side based on the position to which the light control gauge moves may be displayed in gray and a lower side area may be displayed in a different color (in blue as shown in the drawings). In this case, preferably, the color constituting the lower side area corresponds to the color of light generated from the corresponding light. For example, the light generated from the corresponding light has a red color, and the lower side area of the brightness control gauge may be filled with a red color.

Thus, the user may easily set the brightness level of a light by using the brightness control gauge and may easily recognize a currently set level of brightness.

In addition, the user may set the level of brightness by moving up and down the brightness control gauge of the brightness level setting area 1810. Differently from the above, the light control apparatus 300 may further display a numeral input window through which the level of brightness may be directly input by long touching or short double-touching the brightness level setting area 1810. Thus, the brightness level of the light may be set by inputting a numeral corresponding to a brightness level desired by the user.

The information about the level of brightness set through the brightness level setting area 1810 is displayed on the brightness level displaying area 1820.

The information about a currently selected light is displayed on the light information displaying area 1830. In other words, the information about a specific light or group to which an operating condition set through the corresponding picture is to be applied is displayed on the light information displaying area 1830.

The power control area 1840 may be provided for controlling power of the currently selected light. The user may change the powering state of the specific light or group by using the menu displayed on the power control area 1840.

A menu for setting a schedule of the currently selected light is displayed on the schedule setting area 1850. The schedule setting signifies that the user presets the powering state or brightness level of the light as a function of time and the operating state of the corresponding light is automatically changed according to the set schedule.

A menu for turning on or off the NFC function of the currently selected light is displayed on the NFC area 1860. The user may turn on or off the NFC function of the corresponding light by using the menu.

A menu for setting a timer of the currently selected light is displayed on the timer setting area 1870.

Meanwhile, operating state information about whether a preset schedule or a timer for the corresponding light exists is further displayed on the detail condition setting picture 1800.

In addition, additional information about an MAC address of the corresponding light, a firmware version, a current dimming state and the number of lights belonging to the corresponding light group to which the corresponding light belongs may be further displayed on the detail condition setting picture 1800.

Figure 19:
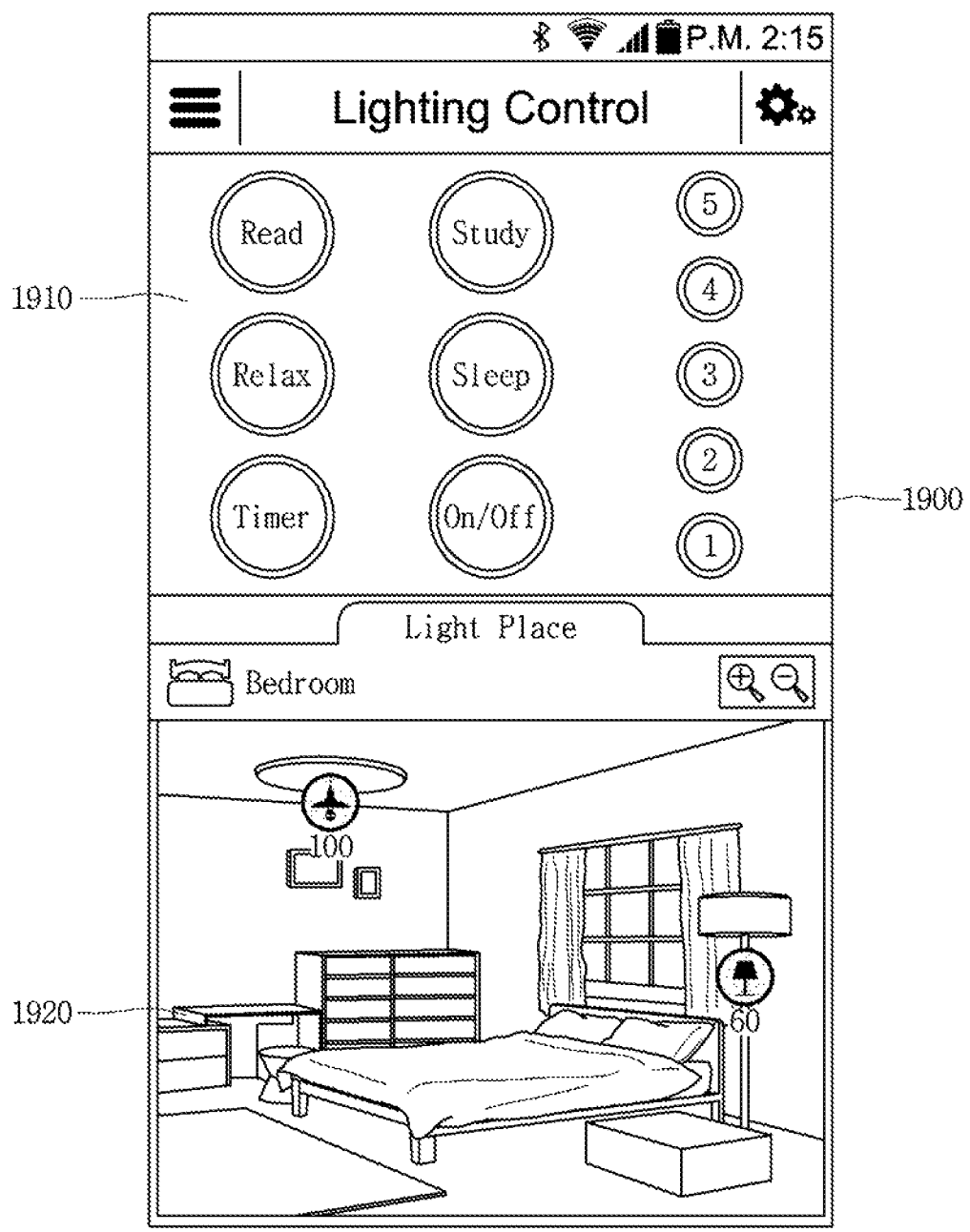

FIG. 19 shows an operating mode setting picture according to an embodiment.

The user may directly set the brightness level of a specific light or the brightness levels of lights belonging to a specific light group through the picture shown in FIG. 18. However, differently from the above, as the operating mode is selected through the operating mode setting picture, the brightness level may be set.

The operating mode setting picture 1900 includes a first area 1910 on which an icon corresponding to at least one operating mode information, in which light information such as information about a bright level or information about a color temperature is preset, is displayed, and a second area 1920 on which location information corresponding to the currently selected light group is displayed.

A plurality of operating mode icons are displayed on the first area 1910.

The brightness level or color temperature of a light is preset in the operating mode icon. Thus, the user may easily set the brightness level or color temperature of the light by selecting one icon from the operating mode icons displayed on the first area 1910.

As well as the operating mode icon, an icon (numeral icon) in which the operating information of a light arbitrarily designated by the user is included in the first area 1910.

In addition, an icon for setting the timer of the lighter or controlling power on or off of the light is further displayed on the first area 1910.

The information about the location of the light group to which the currently selected light belongs or the currently selected light group is displayed on the second area 1920. As described above, the location information includes a photo photographed at the actual place of the light group and light icons disposed at the actually installed locations on the photo.

In addition, the user may set whether the location information to be displayed on the second area 1920 is displayed on the operating mode setting picture 1900.

Figure 20:
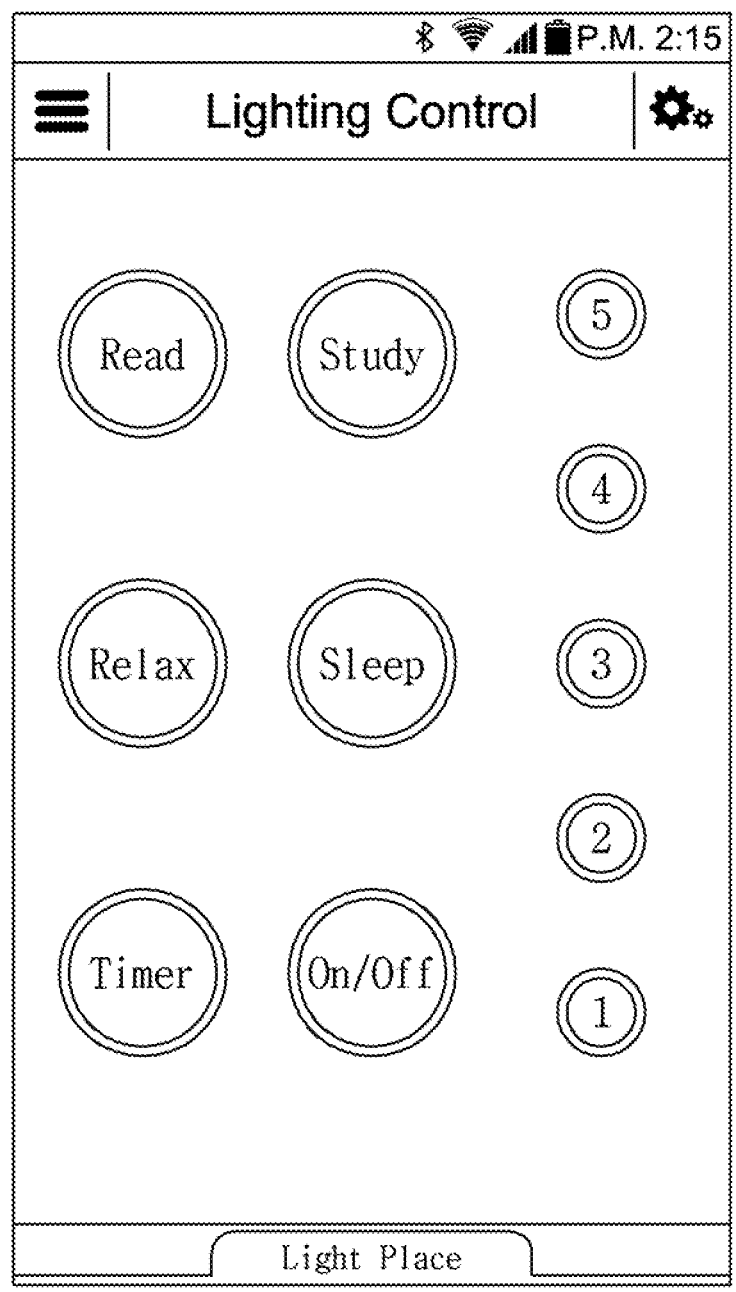

When the state of displaying the location information displayed on the second area is inactivated, as shown in FIG. 20, the location information displayed on the second area disappears from the second area, so that the information displayed on the first area 1910 is enlarged on the entire picture.

Figure 21:
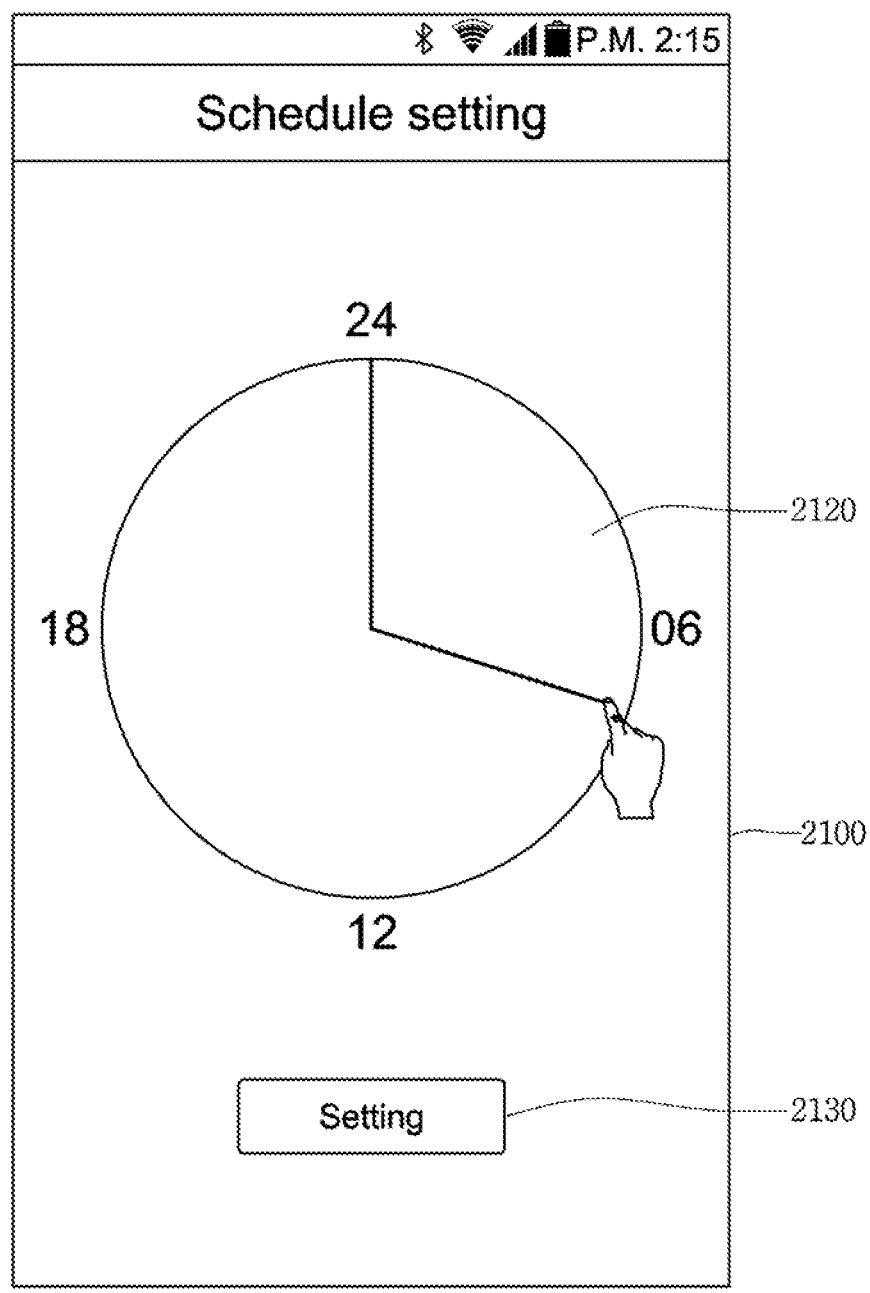

In addition, referring to FIG. 21, when the menu displayed on the schedule setting area 1850 is selected, the light control apparatus 300 allows the schedule setting picture 2100 for setting a schedule of the currently selected light to be displayed.

The schedule setting picture 2100 includes a setting button displaying area 2130 on which a setting button for storing the currently set schedule information is displayed.

The user may set the schedule of the selected light by moving a minute or hour hand displayed on the time setting area 2120.

Hereinafter, the process of wirelessly connecting the switch, which controls the registered light 100 by using the graphical user interface provided through the touch screen of the light control apparatus 300, to the light 100 will be described in more detail.

A light system according to an embodiment further includes a switch as well as the light control apparatus 300.

The switch is provided to directly control at least one light wirelessly connected thereto.

That is, although it is easy to control a plurality of lights in groups or set an operating state in detail through the light control apparatus 300, it is somewhat inconvenient to perform a simple on/off control through the light control apparatus 300. In other words, when it is desired to turn on or off only a specific light, the light control apparatus 300 must display a control picture for setting an operating state of the specific light. Thus, the operating state of the specific light must be changed on the displayed control picture.

Therefore, according to the embodiment, by providing the switch wirelessly connected to a light as well as the light control apparatus 300, the operation of the light may be easily controlled through the switch.

Figure 22:
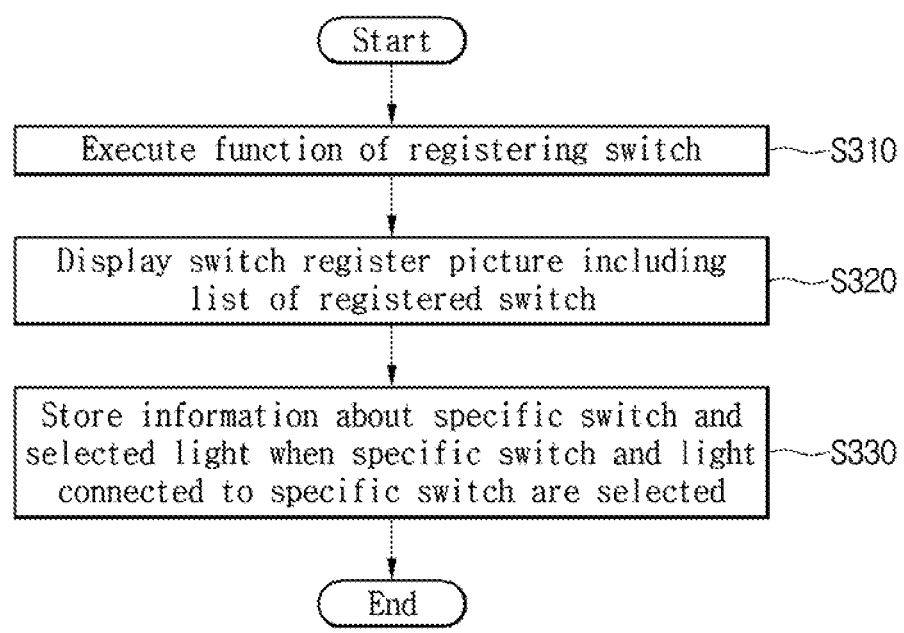
FIG. 22 is a flowchart sequentially illustrating a method of registering a switch according to an embodiment.
Figure 23:
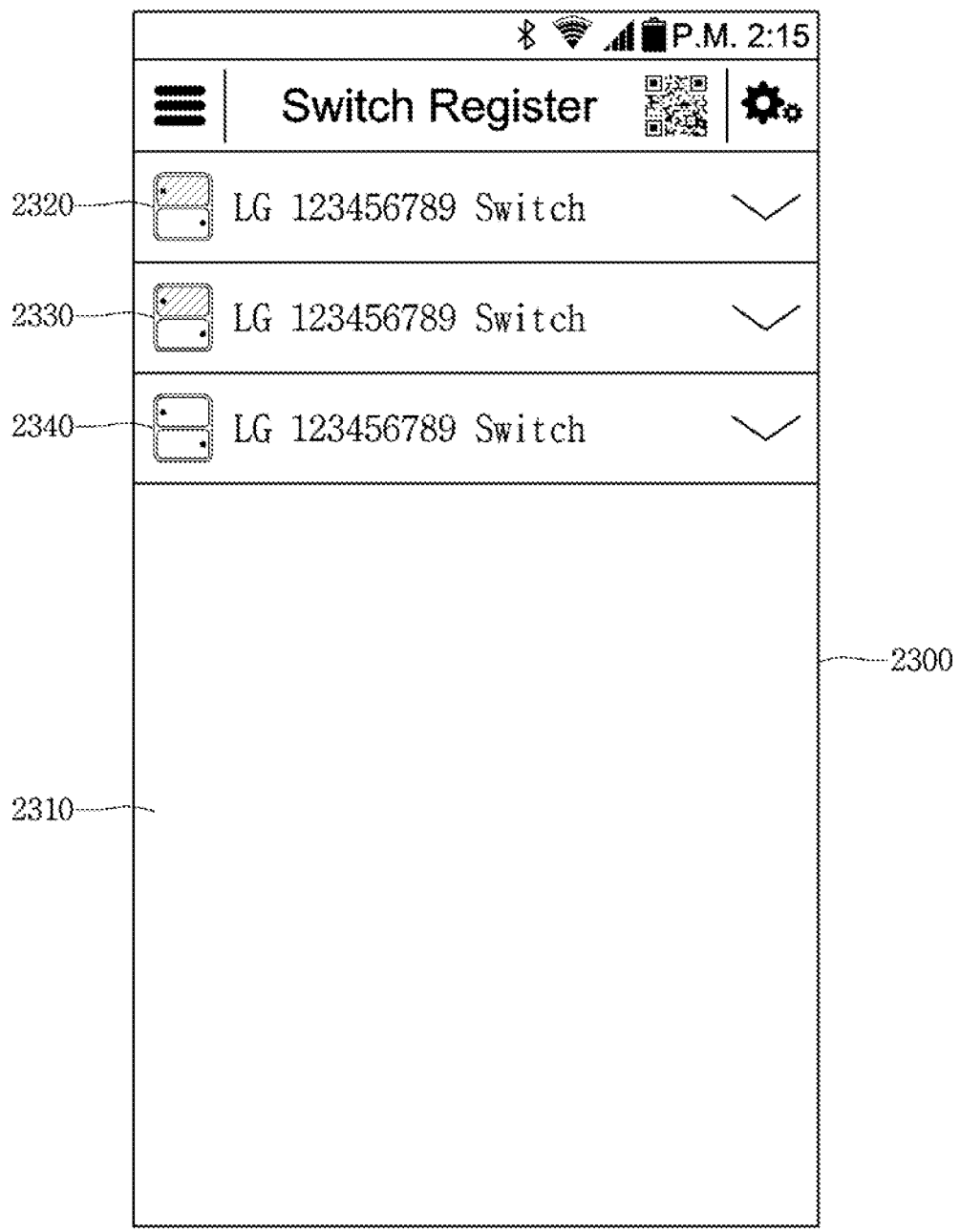
FIGS. 23 and 24 are views showing a switch registering picture according to an embodiment.
Figure 24:
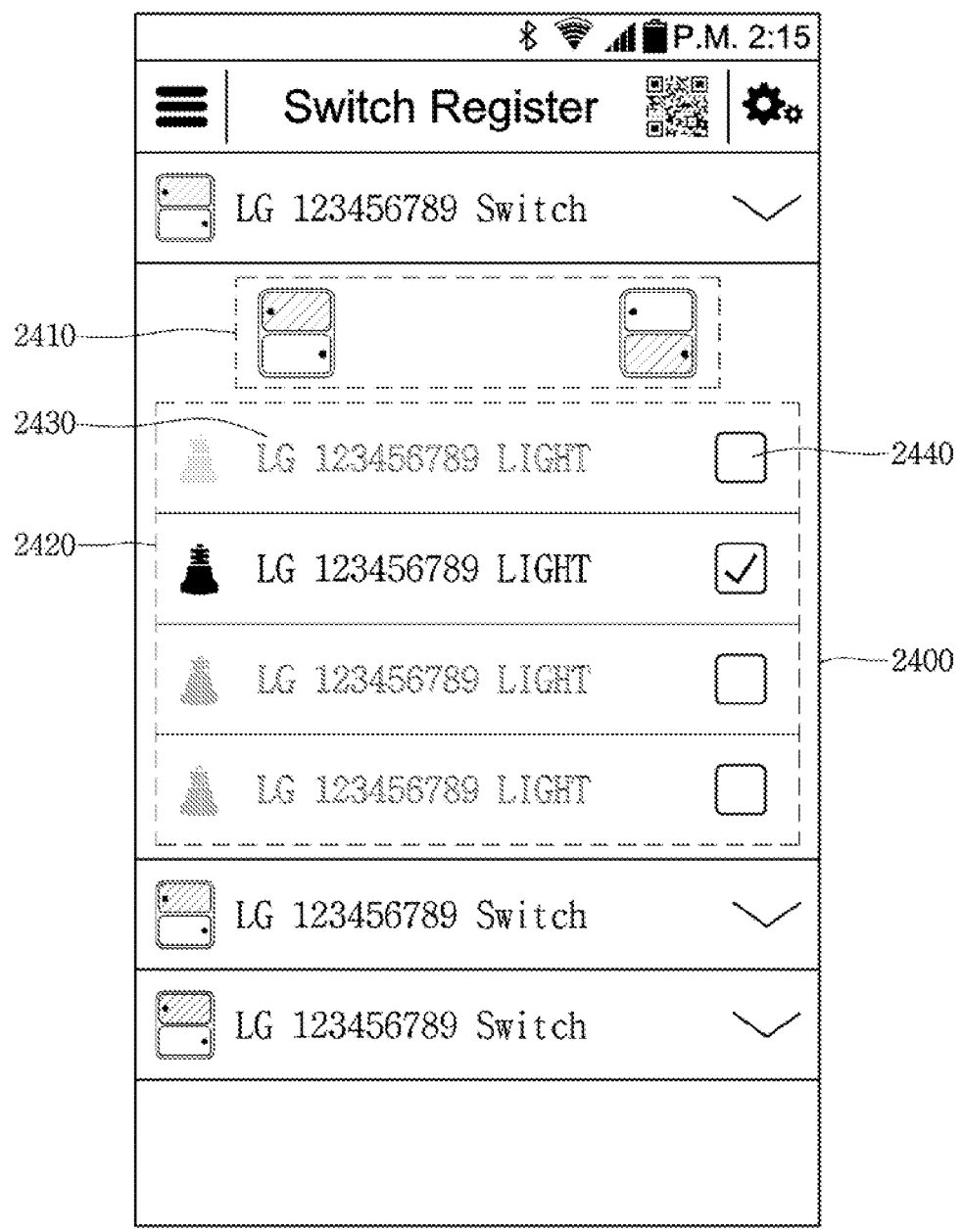

FIG. 22 is a flowchart sequentially illustrating a method of registering a switch according to an embodiment. FIGS. 23 and 24 are views showing a switch registering picture according to an embodiment.

Referring to FIG. 22, the light control apparatus 300 executes a function of registering a switch in step S310 and allows a switch register picture including a list of switches to be displayed in step S320.

Referring to FIG. 23, the list of switches including information about the detected switches or the switches to which any lights are not connected though being previously detected is displayed on the switch registering picture 2310.

Information about first to third switches 2320 to 2340 is represented on the switch list.

Again, referring to FIG. 22, when a switch selected on the displayed switch registering picture and a light connected to the selected switch are selected, the light control apparatus 300 stores information about the selected switch and the selected light in step S330.

That is, referring to FIG. 24, when one switch (it is depicted in the drawings to select information about the first switch) is selected from the switches in the switch list, a picture for selecting a light connected to the selected switch is displayed.

The picture includes a first area 2410 on which a location selecting button for selecting a location of the selected switch is displayed and a second area 2420 on which a list of previously registered lights is displayed.

The information 2430 about the light previously registered to the light control apparatus 300 and a check box for selecting each light included in the light information 2430 are displayed on the second area 2420.

A user may select the check box 2440 corresponding to the light connected to the selected switch.

When a specific light is selected through the check box 2440, the light control apparatus 300 wirelessly connects the selected switch to the selected light.

Thus, when a user turns on or off a light by using the selected switch, the light wirelessly connected to the selected switch is powered on or off.

According to the embodiment, a light may be conveniently registered through a wireless light technique by using a mobile terminal such as a smart phone, and thus, the operation of the registered light may be easily controlled.

In addition, according to the embodiment, the light corresponding to the light icon is registered by moving the light icon onto the photo of the actual installation place of the light, so that the light may be instinctively disposed while improving convenience of the light registering.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:
1. A light control apparatus comprising:
a touch screen configured to display a first graphical user interface for registering unregistered lights of a plurality of lights installed near the light control apparatus; and
a controller that is wirelessly connected to and that wirelessly controls the plurality of lights, the controller being configured to store register information of the unregistered lights that is set through the first graphical user interface and to control lights registered based on the stored register information,
wherein the first graphical user interface comprises:
a first area in which information about the unregistered lights is displayed; and
a second area in which location information for setting an installed location of a first light selected from the unregistered lights displayed in the first area is displayed,
wherein the controller is configured to
initiate a search for the unregistered lights of the plurality of lights installed near the light control apparatus,
display, in the first area of the first graphical user interface, a first list of the unregistered lights when the unregistered lights are detected,
display, in the second area of the first graphical user interface, a second list of previously registered installing places when the first light is selected from the first list,
display, in the second area of the first graphical user interface, the location information of the first light corresponding to a previously registered installing place selected from the second list,
display a second graphic user interface for controlling the registered lights on the touch screen when the unregistered lights are registered,
wherein the second graphic user interface includes a third area for displaying group information corresponding to a previously registered light group, and
a fourth area for displaying location information corresponding to a specific light group preselected from the light groups included in the third area,
wherein the location information displayed on the fourth area includes an image corresponding to an installed place of the specific light group selected through the third area, and light state icons displayed on the image to represent lights belonging to the selected specific light group,
wherein the light state icons represent information of a current operating state of a corresponding light, and the information of the current operating state includes power state information and brightness information,
wherein when the first light is turned on, a light state icon corresponding to the first light is displayed based on a color of light radiated from the first light,
wherein the brightness information is a numeral representing a level of brightness of a corresponding light,
wherein the controller is configured to display on the third area, a light group icon representing a light group,
wherein the light group icon further includes information of a number of lights belonging to a corresponding light group,
wherein the controller is configured to display on the third area, a control tap for batch controlling and separately controlling a light belonging to the corresponding light group,
wherein the light group icon is displayed in mutually different forms according to whether the light belonging to the corresponding light group exists,
wherein when a previously registered light exists in a first group, the light group icon corresponding to the first group is displayed while being activated, wherein when any previously registered lights do not exist in a second group, the light group icon corresponding to the second group is displayed while being inactivated, wherein the location information of the first light is stored in an image captured at the first installing place, wherein the register information includes the installed location of the first light, wherein the setting of the installed location of the first light is performed by touch dragging the installed location information about the first light displayed in the first area to a first location on the image displayed in the second area, wherein the image displayed in the second area is divided into a plurality of areas when the information about the first light is dragged on the first graphical user interface, wherein the first light is classified into a group corresponding to the first installing place, wherein the first light and a second light are grouped into a same group when the first and second lights are set in a state in which the image of the same installed place is displayed, and wherein the unregistered lights corresponding to the light state icons are registered by moving the light state icons onto images of actual installation places of the unregistered lights.

2. The light control apparatus of claim 1, wherein the controller is configured to display, in the first area of the first graphical user interface, an icon list for setting a type for the first light, wherein the first area includes:

a text area for displaying a name of a light, and an icon area for displaying icons of lights, wherein each icon of light includes a type icon representing a type of a corresponding light, and wherein the icons of lights which are different from each other according to types of lights are displayed in the icon area.

3. The light control apparatus of claim 2, wherein the first list of the unregistered lights includes Media Access Control addresses of the unregistered lights.

4. The light control apparatus of claim 3, wherein a light icon corresponding to the first light is displayed at the first location of the image according to the touch dragging, and wherein the installed location of the first light is set based on a location in a physical space corresponding to the first location on the image.

5. The light control apparatus of claim 4, wherein the light state icons displayed on the image are displayed at positions on the image corresponding to actually installed locations of each light.

6. The light control apparatus of claim 5, wherein the controller is configured to display, on the touch screen, a switch setting image setting the switch to be wirelessly connected to the previously registered light group, wherein the switch setting image includes a switch list area having information of a switch list, and a light list area having information of a list of the previously registered lights when a first switch is selected from the switch list displayed, wherein when at least one light is selected from the light list displayed, the selected light is wirelessly connected to the first switch.

7. The light control apparatus of claim 2, wherein the controller is configured to assign the light name of the first light when the installed location and the type of the first light are set, wherein the assigned light name of the first light includes:

a first part representing the installed location of the first light, and a second part representing a type of the first light.

8. The light control apparatus of claim 7, wherein a menu for registering a new installing place is displayed in the second area of the first graphical user interface, wherein the controller is configured to display, in the second area of the first graphical user interface, a name input window for inputting a name of the new installing place and a menu for registering an image of the new installing place.

9. The light control apparatus of claim 8, wherein the controller is configured to display on the second area names of a plurality of installing places and an image captured at a specific installing place preselected from the plurality of installing places.

10. A method of controlling a light, the method comprising:

initiating a search, via a controller, for unregistered lights of a plurality of lights installed near a light control apparatus, wherein the controller is wirelessly connected to and wirelessly controls the plurality of lights;

displaying a first graphical user interface for registering the unregistered lights, via the controller, when the unregistered lights are detected, wherein the first graphical user interface comprises a first area in which information about the unregistered lights is displayed; and a second area in which location information for setting an installed location of a first light selected from the unregistered lights displayed in the first area is displayed, displaying, via the controller, in the second area of the first graphical user interface, a second list of previously registered installing places when the first light is selected from a first list, displaying, via the controller, in the second area of the first graphical user interface, the location information of the first light corresponding to a previously registered installing place selected from the second list, setting, via the controller, an installed location of the first light by touch dragging the installed location information about the first light displayed in the first area to a first location on an image displayed in the second area, and storing, via the controller, register information of the first light that is set through the first graphical user interface, wherein the register information includes the installed location of the first light, displaying, via the controller a second graphical user interface for controlling the registered light, wherein the second graphic user interface includes a third area for displaying group information corresponding to a previously registered light group, and a fourth area for displaying location information corresponding to a specific light group preselected from the light groups included in the third area, wherein the location information displayed on the fourth area includes an image corresponding to an installed place of the specific light group selected through the third area, and light state icons displayed on the image to represent lights belonging to the selected specific light group, wherein the light state icons represent information of a current operating state of a corresponding light, and the information of the current operating state includes power state information and brightness information, wherein when the first light is turned on, a light state icon corresponding to the first light is displayed based on a color of light radiated from the first light, wherein the brightness information is a numeral representing a level of brightness of a corresponding light, wherein a light group icon representing a light group is displayed on the third area, via the controller, wherein the light group icon further includes information of a number of lights belonging to a corresponding light group, wherein a control tap for batch controlling and separately controlling a light belonging to the corresponding light group is displayed in the third area, via the controller, wherein the light group icon is displayed in mutually different forms according to whether the light belonging to the corresponding light group exists, wherein when a previously registered light exists in a first group, the light group icon corresponding to the first group is displayed while being activated, wherein when any previously registered lights do not exist in a second group, the light group icon corresponding to the second group is displayed while being inactivated, wherein the first list of the unregistered lights includes Media Access Control addresses of the unregistered lights, wherein the image displayed in the second area is divided into a plurality of areas when the information about the first light is dragged on the first graphical user interface, wherein a light icon corresponding to the first light is displayed at the first location of the image according to the touch dragging, wherein the installed location of the first light is set at a location in a physical space corresponding to the first location on the image, and wherein the unregistered lights corresponding to the light state icons are registered by moving the light state icons onto images of actual installation places of the unregistered lights.

11. The method of claim 10, wherein the displaying of the first graphical user interface comprises:

displaying, in the first area of the first graphical user interface, an icon list for setting a type of the first light, wherein the first area includes:

a text area for displaying a name of a light, and an icon area for displaying an icon of a light, wherein the icon of the light includes a type icon for representing a type of a corresponding light, and wherein the icon of the light is in a form according to a type of the light and is displayed in the icon area.

12. The method of claim 11, further comprising:

assigning a light name of the first light when the installed location and the type of the first light are set, wherein the assigned light name of the first light includes a first part representing the installed location of the first light, and a second part representing a type of the first light.

13. The method of claim 12, wherein a menu for registering a new installing place is displayed in the second area of the first graphical user interface, wherein the displaying of the first graphical user interface comprises displaying, in the second area of the first graphical user interface, a name input window for inputting a name of the new installing place and a menu for registering an image of the new installing place.

14. The method of claim 13, further comprising displaying, via the controller, names of a plurality of installing places and an image captured at a specific installing place preselected front the plurality of installing places in the second area.

15. The method of claim 14, wherein the light state icons displayed on the image are displayed at positions on the image corresponding to actually installed locations of each light.

16. The method of claim 15, further comprising displaying, via the controller, a switch setting image for setting the switch to be wirelessly connected to the previously registered light group, wherein the switch setting image includes a switch list area having information of a switch list, and a light list area having information of a list of the previously registered lights when a first switch is selected from the switch list displayed, wherein when at least one light is selected from the light list displayed, the selected light is wirelessly connected to the first switch.

* * * * *